US008321452B2

(12) United States Patent
Nakamura

(10) Patent No.: US 8,321,452 B2
(45) Date of Patent: Nov. 27, 2012

(54) INFORMATION PROCESSING SYSTEM, APPARATUS AND METHOD FOR INFORMATION PROCESSING, AND RECORDING MEDIUM

(75) Inventor: Masahiro Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 12/109,840

(22) Filed: Apr. 25, 2008

(65) Prior Publication Data

US 2008/0275852 A1 Nov. 6, 2008

(30) Foreign Application Priority Data

Apr. 25, 2007 (JP) ................................ 2007-115729

(51) Int. Cl.
*G06F 17/30* (2006.01)
(52) U.S. Cl. ........................ 707/770; 707/913
(58) Field of Classification Search .................. 707/913, 707/706, 712, 999.107, 770
See application file for complete search history.

(56) References Cited

U.S. PATENT DOCUMENTS

| 7,216,008 B2* | 5/2007 | Sakata ........................... 700/94 |
| 7,669,214 B2* | 2/2010 | Ozaki ............................ 725/44 |
| 7,870,615 B2* | 1/2011 | Machida et al. ............... 726/29 |
| 2003/0123853 A1* | 7/2003 | Iwahara et al. ................ 386/69 |
| 2004/0024643 A1* | 2/2004 | Pollock et al. ................. 705/16 |
| 2004/0039723 A1* | 2/2004 | Lee et al. ......................... 707/1 |
| 2004/0040041 A1* | 2/2004 | Crawford ........................ 725/88 |
| 2004/0070576 A1* | 4/2004 | Sakurai et al. ................ 345/204 |
| 2004/0170386 A1* | 9/2004 | Mikawa ........................ 386/69 |
| 2005/0028204 A1* | 2/2005 | Nakamura et al. ............. 725/45 |
| 2005/0262217 A1* | 11/2005 | Nonaka et al. ............... 709/217 |
| 2006/0025920 A1* | 2/2006 | Nezu et al. .................... 701/200 |
| 2006/0029374 A1* | 2/2006 | Park ............................. 386/125 |
| 2006/0239646 A1* | 10/2006 | Kang ............................. 386/95 |
| 2006/0259474 A1* | 11/2006 | Granito .......................... 707/3 |
| 2006/0262221 A1* | 11/2006 | Yuasa et al. .................. 348/553 |
| 2007/0024594 A1* | 2/2007 | Sakata et al. ................. 345/173 |
| 2007/0056048 A1* | 3/2007 | Machida et al. ............... 726/29 |
| 2007/0085840 A1* | 4/2007 | Asaka et al. .................. 345/173 |

(Continued)

FOREIGN PATENT DOCUMENTS

JP          2002-366558          12/2002

(Continued)

OTHER PUBLICATIONS

Office Action issued Mar. 6, 2012, in Japanese Patent Application No. 2007-115729 (with English-language translation).

(Continued)

*Primary Examiner* — Thanh-Ha Dang
(74) *Attorney, Agent, or Firm* — Oblon, Spivak, McClelland, Maier & Neustadt, L.L.P.

(57) ABSTRACT

An information processing system includes a plurality of first information processing apparatuses, each of the plurality of first information processing apparatuses being configured to add search information and post content, and a second information processing apparatus for holding the search information matching the content posted from at least one of the plurality of first information processing apparatuses. Upon receipt of a request to provide the content which is previously retrieved from one of the first information processing apparatuses, the second information processing apparatus performs another search based on a search condition stored at a last search by the second information processing apparatus itself or by the one of the first information processing apparatuses, and provides the content which is newly retrieved to the one of the first information processing apparatus in response to the request.

15 Claims, 25 Drawing Sheets

U.S. PATENT DOCUMENTS

| | | | |
|---|---|---|---|
| 2007/0183743 A1* | 8/2007 | Tanikawa et al. | 386/83 |
| 2007/0198595 A1* | 8/2007 | Obata et al. | 707/200 |
| 2007/0250877 A1* | 10/2007 | Ozaki | 725/89 |
| 2008/0086688 A1* | 4/2008 | Chandratillake et al. | 715/719 |
| 2008/0091643 A1* | 4/2008 | Malik | 707/2 |
| 2009/0142037 A1* | 6/2009 | Mikawa | 386/95 |

FOREIGN PATENT DOCUMENTS

| | | |
|---|---|---|
| JP | 2003-196303 | 7/2003 |
| JP | 2004-318516 | 11/2004 |
| JP | 2006-215811 | 8/2006 |
| JP | 2006-301975 | 11/2006 |

OTHER PUBLICATIONS

Yoshiaki Kurata, "Direct toward YouTube expert!", MAC People, ASCII, Inc., vol. 12, No. 10, Oct. 2006, pp. 201-207.

Nobuyuki Mori, "Enviable Mac OS X 10.4 Tiger!", ASCII, Inc., vol. 29, No. 7, Jul. 2005, pp. 60-69.

* cited by examiner

INFORMATION PROCESSING SYSTEM, APPARATUS AND METHOD FOR INFORMATION PROCESSING, AND RECORDING MEDIUM

CROSS-REFERENCE TO RELATED APPLICATIONS

The present application claims benefit of priority of Japanese patent Application No. 2007-115729 filed in the Japanese Patent Office on Apr. 25, 2007, the entire disclosure of which is incorporated herein by reference.

BACKGROUND OF THE INVENTION

1. Field of the Invention

The present invention relates to an information processing system, an apparatus and method for information processing, a computer program product, and a recording medium.

2. Description of Related Art

With a widespread use of the Internet, systems of various types for exchanging information via the Internet have been proposed. For example, Japanese Unexamined Patent Application Publication No. 2002-342206 (hereinafter referred to as "Patent Document 1") discloses a technique relating to such a system.

In a system according to the Patent Document 1, a program frequently used by a user is registered automatically, or a program designated by the user is registered to generate a program list, and the program list is registered in a user's personal computer.

When the user selects one program list out of a plurality of program lists, program addresses registered in the program list are sequentially accessed, and content of the program (content of hypertext) registered in the program list is shown on a display. Accordingly, the user only selects the program list, and then a desired program may be automatically reproduced even if the user does not perform any further action.

SUMMARY OF THE INVENTION

However, in the system of the Patent Document 1, only the programs registered in the program list in the past are played back. That is, it is difficult to provide the user with the latest program information.

The present invention addresses such circumstances, and includes an information processing system/method for constantly providing latest information, an information processing apparatus/method for implementing the system/method, and a computer readable medium for the apparatus/method.

In accordance with one aspect of the present invention, an information processing apparatus is provided which includes: a plurality of first information processing apparatuses, each of which is configured to add search information and post content, and a second information processing apparatus for holding the search information matching the content posted from at least one of the plurality of first information processing apparatuses. In the information processing system, upon receipt of a request to provide the content which is previously retrieved from one of the first information processing apparatuses, the second information processing apparatus performs another search based on a search condition stored at a last search by the second information processing apparatus itself or by the one of the first information processing apparatus, and provides the content which is newly retrieved to the one of the first information processing apparatuses in response to the request.

In accordance with one aspect of the present invention, there is also provided an information processing method of an information processing system provided with a plurality of first information processing apparatuses, each of which is configured to add search information and post content, and a second information processing apparatus for holding the search information matching the content posted from at least one of the plurality of first information processing apparatuses, the information processing method including, upon receipt of a request to provide the content which is previously retrieved from one of the first information processing apparatuses, performing, by the second information processing apparatus, another search based on a search condition stored at a last search by the second information processing apparatus itself or by the one of the first information processing apparatuses, and providing the content which is newly retrieved to the one of the first information processing apparatuses in response to the request.

In accordance with another aspect of the present invention, there is provided an information processing apparatus for holding search information matching content posted from a plurality of other information processing apparatuses, in which upon receipt of a request to provide the content which is previously retrieved from one of the other information processing apparatuses, another search is performed based on a search condition stored at a last search by the information processing apparatus itself or by the one of the other information processing apparatuses, and the content which is newly retrieved is provided to the one of the other information processing apparatuses in response to the request.

The information processing apparatus may include a first information processing apparatus which accepts posting from the other information processing apparatuses, and a second information processing apparatus which provides the content, and the first information processing apparatus and the second information processing apparatus may be connected to the other information processing apparatuses via the Internet.

The information processing apparatus may create a list of the content matching the searched search information and may provide the list to the other information processing apparatuses. The other information processing apparatuses register information for specifying the search information. When the provision of the content is requested again by selecting the registered information, the information processing apparatus may perform another search based on the stored search condition.

In accordance with another aspect of the present invention, there is also provided an information processing method of an information processing apparatus for holding search information matching content posted from a plurality of other information processing apparatuses, including: upon receipt of a request to provide the content which is previously retrieved from one of the other information processing apparatuses, performing another search based on a search condition stored at a last search by the information processing apparatus itself or by the one of the other information processing apparatuses, and providing the content which is newly retrieved to the one of the other information processing apparatuses in response to the request.

In accordance with another aspect of the present invention, there is also provided a computer readable medium recorded with a program for use in an information processing apparatus for holding search information matching content posted from a plurality of other information processing apparatuses, in which the program causes a computer to execute a method comprising: upon receipt of a request to provide the content which is previously retrieved from one of the other information processing apparatuses, performing another search based on a search condition stored at a last search by the information processing apparatus itself or by the one of the other information processing apparatuses; and providing the content which is newly retrieved to the one of the other information processing apparatuses in response to the request.

In accordance with a further aspect of the present invention, there is provided an information processing apparatus including; means for registering specific information specifying a previously specified search condition, means for transmitting, when the registered specific information is selected, the specific information or the search condition to another information processing apparatus which executes searching, means for receiving from the other information processing apparatus a list of content matching search information searched based on the search condition, means for successively playing back an arbitrary number of the content written on the received list in a sequential manner, and means for displaying symbolic information symbolizing the content included on the list, in a state of playing back the content.

Changing means for changing an order of playing back the content may be further included to change a display position of the displayed symbolic information.

Selecting means for selecting a rule of an order in which the symbolic information is displayed may be further included.

The symbolic information may include a thumbnail of the content.

The display means may move a position of a cursor such that the cursor is positioned on the thumbnail in a process of playing back.

The display means may move, if there is a thumbnail to be newly displayed, the position of the cursor one position at a time such that the cursor is positioned on the thumbnail in the process of playing back until a predetermined position is reached, and scrolls the thumbnail until there is no thumbnail to be newly displayed when the predetermined position is reached, and if there is no thumbnail to be newly displayed, the display means may move a display position of the cursor one position at a time at each playback ending until a playback order reaches a last thumbnail.

The receiving means may receive the list of the content matching the newly searched search information based on the previously specified search condition.

In accordance with a still further aspect of the present invention, there is also provided an information processing method of an information processing apparatus, the information processing method, including:

registering specific information specifying a previously specified search condition;

transmitting the specific information or the search condition to another information processing apparatus which executes searching when the registered specific information is selected;

receiving from the another information processing apparatus a list of content matching search information searched based on the search condition;

playing back successively an arbitrary number of the content written on the received list in a sequential manner; and displaying symbolic information symbolizing the content included on the list, in a state of playing back the content.

In accordance with a still further aspect of the present invention, there is also provided a computer readable medium recorded with a program for use in an information processing apparatus, in which the recording medium is recorded with a program causing a computer to execute a method comprising:

registering specific information specifying a previously specified search condition;

transmitting the specific information or the search condition to another information processing apparatus which executes searching when the registered specific information is selected;

receiving from the another information processing apparatus a list of content matching search information searched based on the search condition;

playing back successively an arbitrary number of the content written on the received list in a sequential manner; and displaying symbolic information symbolizing the content included on the list, in a state of playing back the content.

According to one aspect of the present invention, there are provided: a plurality of first information processing apparatuses, each of which add search information and post content; and second information processing apparatus for holding the search information matching the content posted from at least one of the plurality of first information processing apparatuses. Upon receipt of a request to provide the content which is previously retrieved from one of the first information processing apparatuses, the second information processing apparatus performs another search based on a search condition stored at a last search by the second information processing apparatus itself or by the one of the first information processing apparatus, and provides the content which is newly retrieved to the one of the first information processing apparatuses in response to the request.

According to another aspect of the present invention, in an information processing apparatus for holding search information matching content posted from a plurality of other information processing apparatuses, upon receipt of a request to provide the content which is previously retrieved from one of the other information processing apparatuses, another search is performed based on a search condition stored at a last search by the information processing apparatus itself or by the one of the other information processing apparatus, and the content which is newly retrieved is provided to the one of the other information processing apparatuses in response to the request.

According to further aspect of the present invention, specific information specifying a previously specified search condition is registered; when the registered specific information is selected, the specific information or the search condition is transmitted to another information processing apparatus which executes searching; a list of content matching search information searched based on the search condition is received from the other information processing apparatus; an arbitrary number of content written on the received list are successively played back in a sequential manner; and symbolic information symbolizing the content included on the list is displaying in a state where the content are played back.

As described above, according to embodiments of the present invention, the latest information is provided to a user.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

Prior to describing embodiments of the present invention below, a correlation among constituents of the present invention and an embodiment in the specification or in the accompanying drawings is exemplified as follows: This is aimed to prove that embodiments provided for the purpose of supporting embodiments of the present invention are described in the specification or in the accompanying drawings. Therefore, even if there is any specific embodiment found in the specification or in the accompanying drawings but not described here as the embodiment corresponding to the constituents of the invention, it does not mean that the embodiment is not correlated with the constituents. On the other hand, even if there is any specific embodiment described here as corresponding to the constituents, it does not mean that the embodiment is only correlated with the constituents.

An embodiment of the present invention is an information processing system (an information processing system 1 in FIG. 1, for example) provided with: a first information processing apparatus (a client 11-1 in FIG. 1, for example) which adds search information and posts content; and a second information processing apparatus (a management server 41 in FIG. 1, for example) for holding the search information matching the content posted from at least one of the plurality of first information processing apparatuses. The second information processing apparatus performs, upon receipt of a request to provide a previously retrieved content from one of the first information processing apparatuses, another search based on the search condition stored at the last search by the second information processing apparatus itself or by the one of the first information processing apparatuses (step S461 in FIG. 12, for example), and provides a newly retrieved content to the one of the first information processing apparatuses in response to the request (step S465 in FIG. 12, for example).

Figure 1:
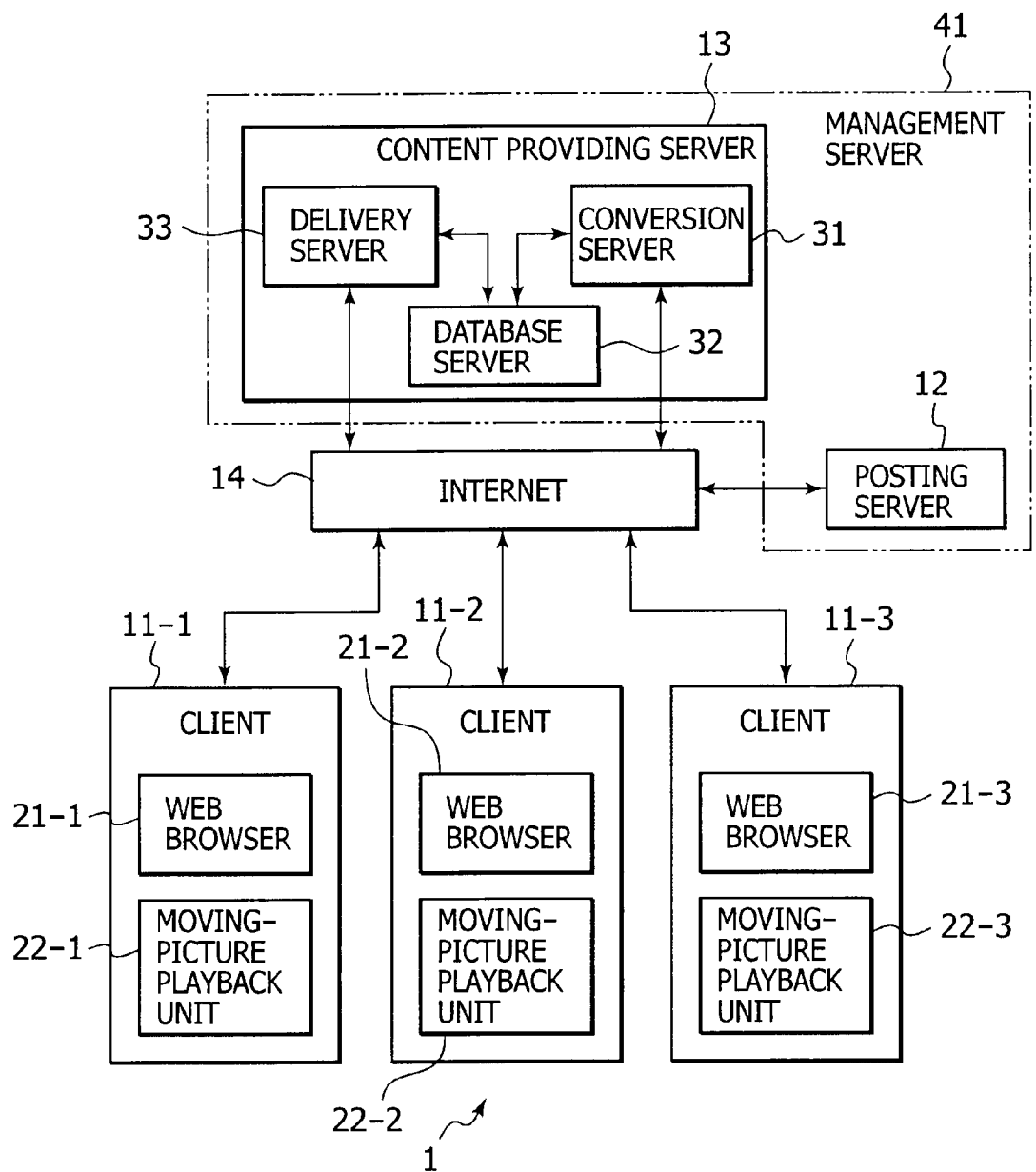
FIG. 1 is a block diagram showing a configuration of one embodiment of an information processing system to which an embodiment of the present invention is applied.

Another embodiment of the present invention is an information processing apparatus (the management server 41 in FIG. 1, for example) for holding the search information matching the content posted from a plurality of other information processing apparatuses (clients 11-1, 11-2, and 11-3 in FIG. 1, for example). The information processing apparatus, upon receipt of a request to provide a previously retrieved content from one of the other information processing apparatuses, performs another search based on a search condition stored at the last search by the information processing apparatus itself or by the one of the other information processing apparatuses (the step S461 in FIG. 12, for example); and provides a newly retrieved content to the one of the other information processing apparatuses in response to the request (the step S465 in FIG. 12, for example).

The information processing apparatus may include an information posting apparatus (a posting server 12 in FIG. 1, for example) which accepts posting from the other information processing apparatuses, and a content providing apparatus (content providing server 13 in FIG. 1, for example) which provides the content, and the information posting apparatus and the content providing apparatus may be connected to the other information processing apparatuses via the Internet.

Figure 10:
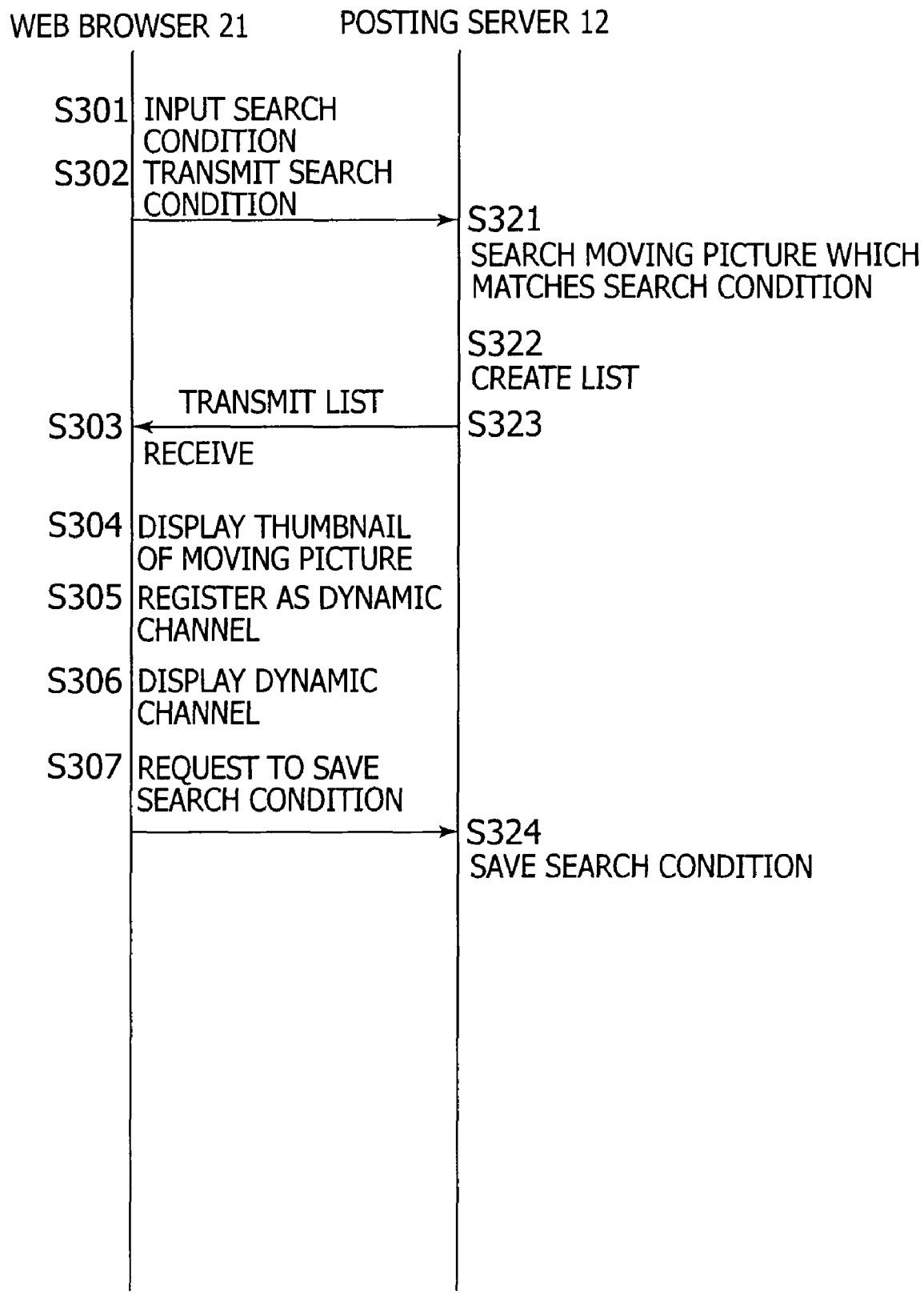
FIG. 10 is a flowchart for describing a process in which a search result is registered.

The information processing apparatus creates a list of the content matching the search information retrieved and provides the list to the other information processing apparatuses (steps S322 and S323 in FIG. 10, for example). The other information processing apparatuses register information for specifying the search information (step S305 in FIG. 10, for example). When the provision of the content is requested again by selecting the registered information (step S431 in FIG. 12, for example), the information processing apparatus performs another search based on the stored search condition (step S461 in FIG. 12, for example).

A still further embodiment of the present invention is an information processing apparatus (the client 11-1 in FIG. 1, for example) provided with; registering means (a registering unit 209 in FIG. 4, for example) for registering specific information specifying a previously specified search condition;

transmitting means (a transmitting unit 207 in FIG. 4, for example) for transmitting, when the registered specific information is selected, the specific information or the search condition to another information processing apparatus which executes searching;

receiving means (a receiving unit 203 in FIG. 4, for example) for receiving from the other information processing apparatus a list of content matching search information searched based on the search condition;

playback means (a moving-image playback unit 22-1 in FIG. 1, for example) for successively playing back an arbitrary number of the content written on the received list in a sequential manner; and display means (a display unit 208 in FIG. 4, for example) for displaying symbolic information (a thumbnail 412 in FIG. 14, for example) symbolizing the content included on the list, in a state of playing back the content.

Changing means (a changing unit 210 in FIG. 4, for example) for changing an order of playing back the content by changing a display position of the displayed symbolic information may be further provided.

Selecting means (an addition button 414 in FIG. 11, for example) for selecting a rule of an order in which the symbolic information is displayed may be further provided.

Figure 13:
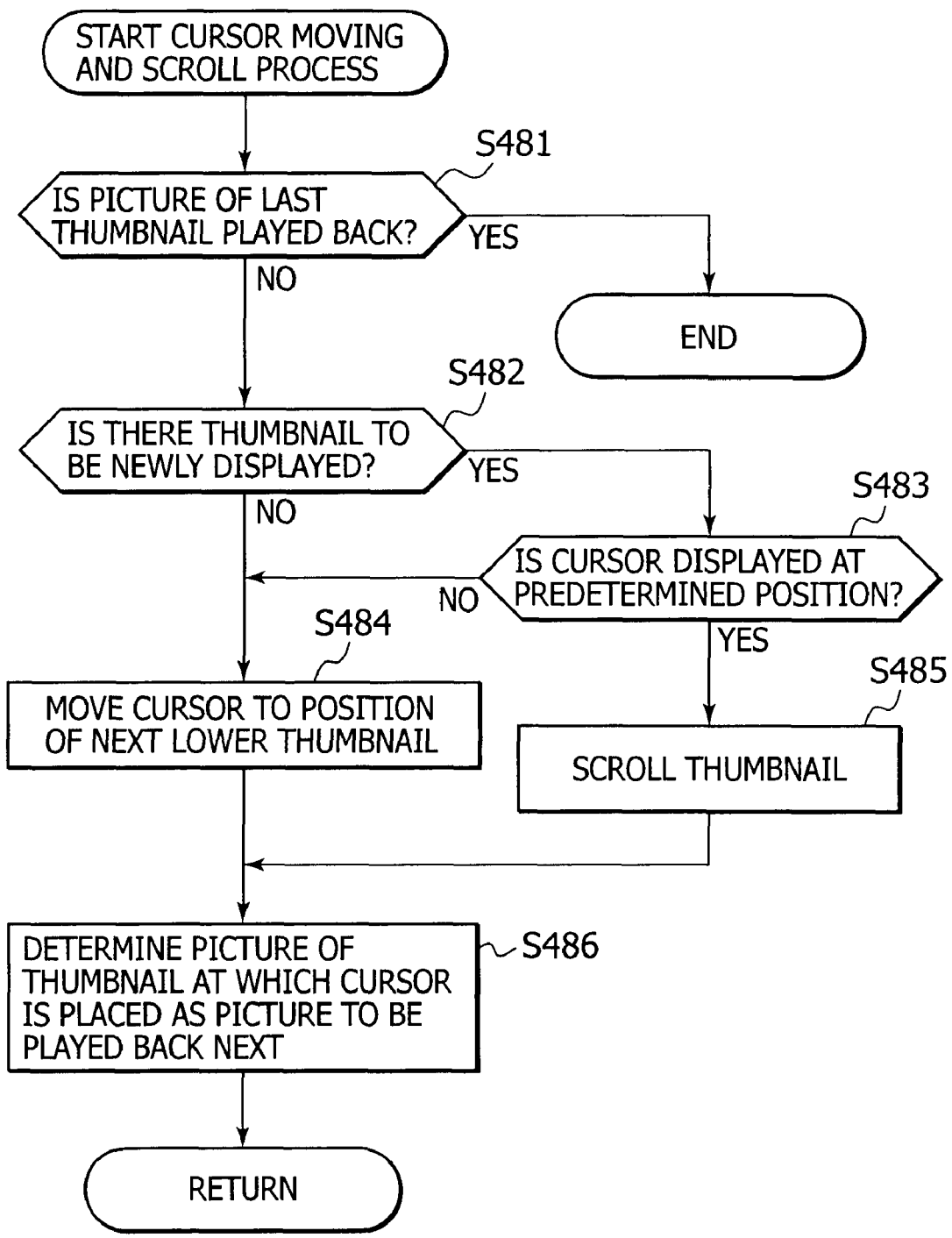
FIG. 13 is a flowchart for describing a cursor movement and a scroll process.

If there is a thumbnail to be newly displayed, the display means moves the position of the cursor one position at a time such that the cursor is positioned on the thumbnail in the process of playing back until a predetermined position is reached (steps S482, S483, and S484 in FIG. 13, for example), and when the predetermined position is reached, scrolls the thumbnail until there is no thumbnail to be newly displayed (steps S482, S483, and S485 in FIG. 13, for example). If there is no thumbnail to be newly displayed, the display means moves a display position of the cursor one position at a time at each playback ending until a playback order reaches a last thumbnail (steps S482 and S484 in FIG. 13, for example).

Figure 12:
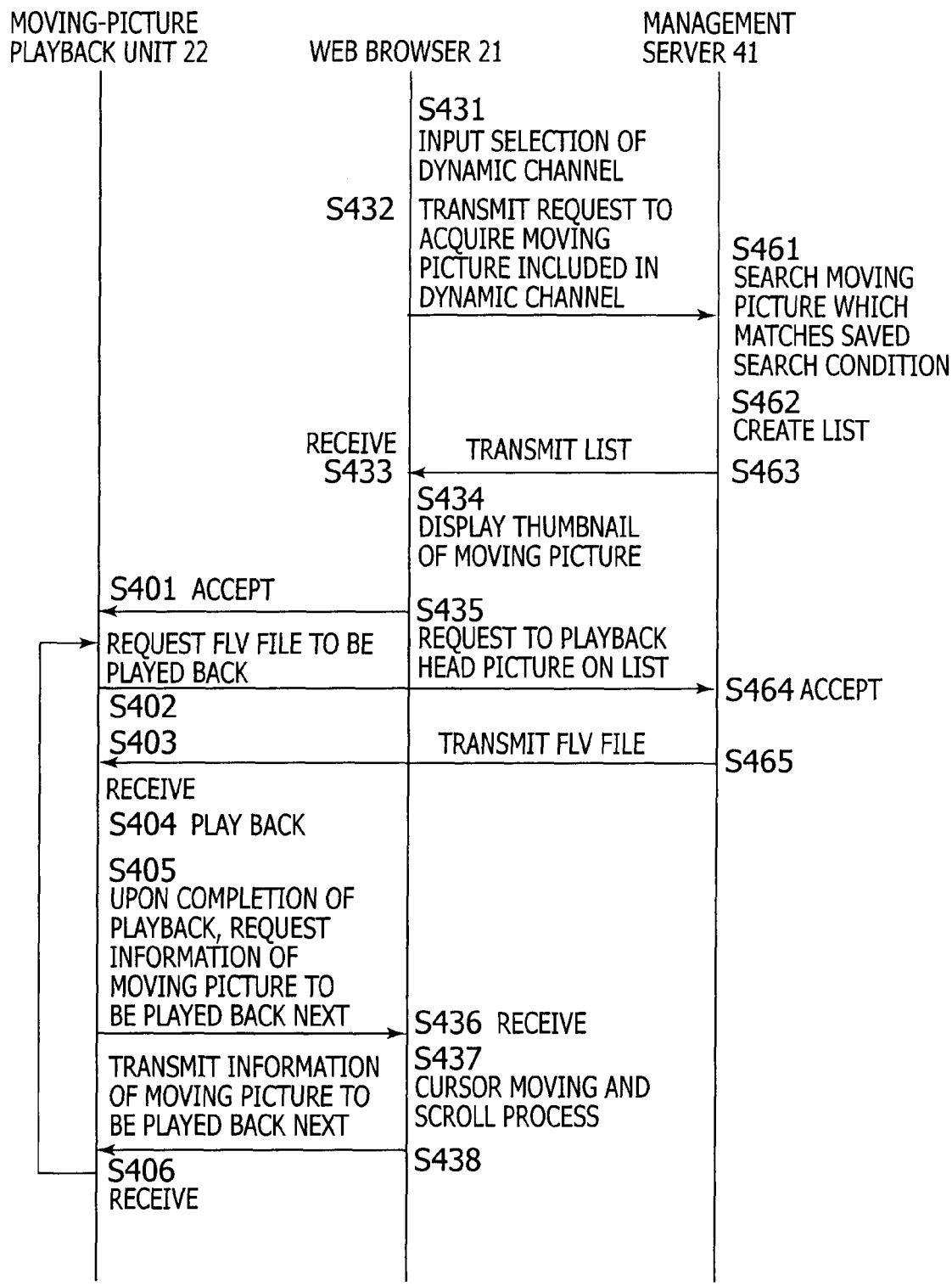
FIG. 12 is a flowchart for describing a process in which an image of a dynamic channel is displayed.

A still further embodiment of the present invention is an information processing method of an information processing apparatus, the information processing method, including:

registering specific information specifying a previously specified search condition (step S305 in FIG. 10, for example);

transmitting the specific information or the search condition to another information processing apparatus which executes searching (step S432 in FIG. 12, for example) when the registered specific information is selected (step S431 in FIG. 12, for example);

receiving from the another information processing apparatus a list of content matching search information searched based on the search condition (step S433 in FIG. 12, for example);

playing back successively an arbitrary number of the content written on the received list in a sequential manner (step S404 in FIG. 12, for example); and displaying symbolic information symbolizing the content included on the list, in a state of playing back the content (step S434 in FIG. 12, for example).

With reference to drawings, embodiments of the present invention are described below.

FIG. 1 is a block diagram showing a configuration of an information processing system according to an embodiment of the present invention. An information processing system 1 includes: a posting server 12; content providing server 13; and any number of (three, in this embodiment) clients 11-1 to 11-3, each of which is connected via the Internet 14, as a network, to one another.

The clients 11-1 to 11-3 which are information processing apparatuses are used by each user who intends to share content (a moving image, for example). The client 11-1 has a Web browser 21-1 and a moving-image playback unit 22-1. These components are realized using software. The Web browser 21-1 is realized using JavaScript (registered trademark), for example, and the moving-image playback unit 22-1 is realized using Flash (registered trademark). Similarly, the clients 11-2 and 11-3 also have Web browsers 21-2 and 21-3, and moving-image playback units 22-2 and 22-3, respectively. The moving-image playback units 22-1 to 22-3 are provided as required from the posting server 12 when the clients 11-1 to 11-3 do not have the moving-image playback units 22-1 to 22-3.

In the following description, when there is no need of individually specifying the clients 11-1 to 11-3, the Web browsers 21-1 to 21-3, and the moving-image playback unit 22-1 to 22-3, these components are simply written as a client 11, a Web browser 21, or a moving-image playback unit 22. The same applies to other devices.

The posting server 12 which is an information processing apparatus accepts the content posted from the client 11 and holds the posted content. The content providing server 13 which is an information processing apparatus includes a conversion server 31; a database server 32, and a delivery server 33. Each of these components also is an information processing apparatus.

The conversion server 31 converts a file of the content into content of a predetermined format based on a request from the posting server 12. The file supplied from the posting server 12 is converted into a file of an FLV (Flash Video) format, which is a format used for a personal computer, or a 3GPP (Third Generation Partnership Project) format, which is a format used for a mobile telephone receiver, for example. The database server 32 holds the file converted by the conversion server 31. The delivery server 33 delivers the content held in the database server 32 via the Internet 14 to the client 11.

In the embodiment, the posting server 12 and the content providing server 13 are managed by independent business entities, but may be managed by an identical business entity. That is, the posting server 12 and the content providing server 13 may be integrated into one unit as required. In this case, the posting server 12 and the content providing server 13 may be considered a management server 41 which is a single information processing apparatus.

Figure 2:
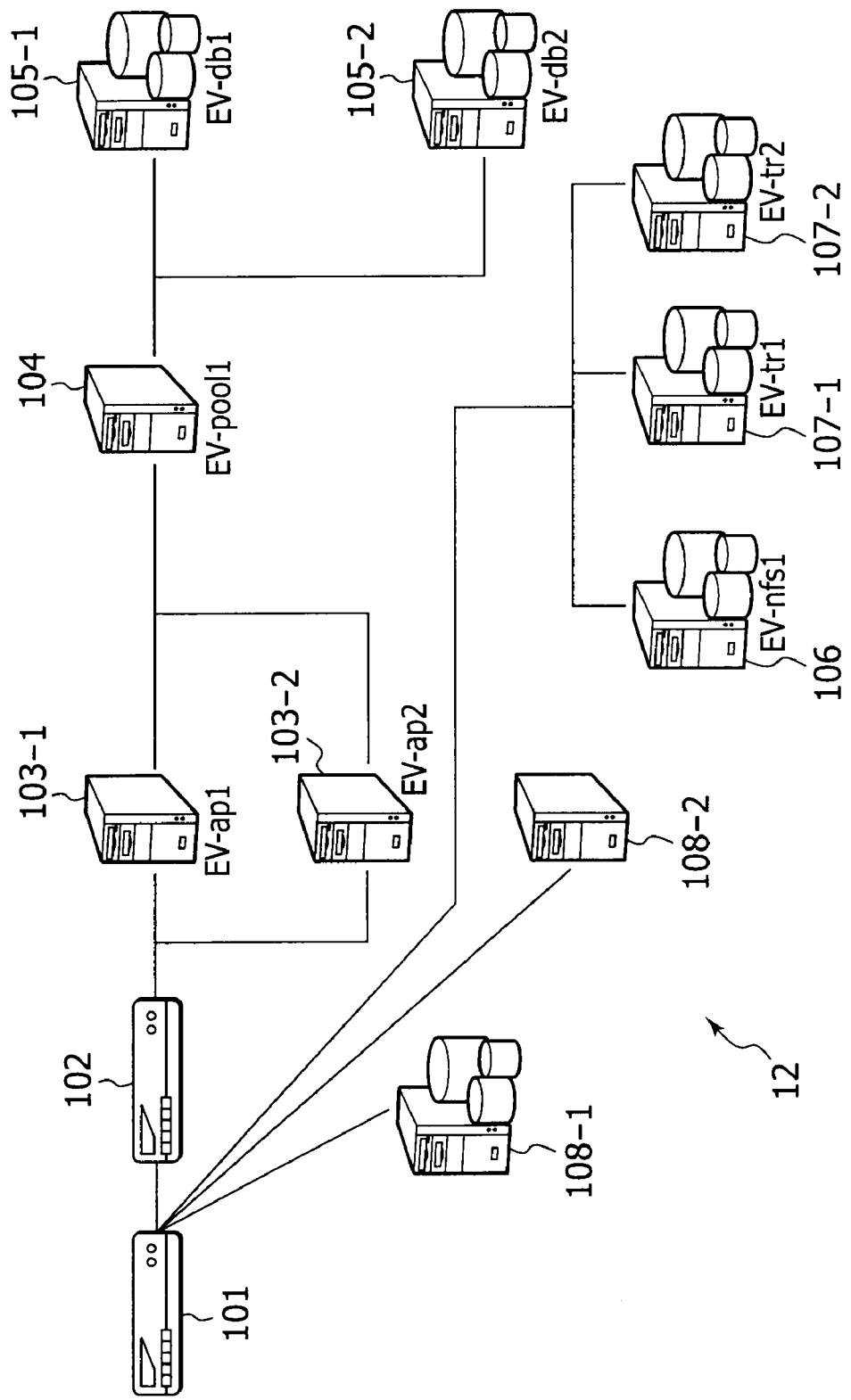
FIG. 2 is a block diagram showing a configuration of one embodiment of a posting server.

FIG. 2 represents the posting server 12 according to an embodiment of the present invention. The posting server 12 includes: a firewall 101; a load balancer 102; application servers 103-1 and 103-2; a working server 104; database servers 105-1 and 105-2; a moving-image-file shared server 106; AVC conversion servers 107-1 and 107-2; and monitoring servers 108-1 and 108-2. Each of these components also is an information processing apparatus.

The firewall 101 is directly connected to the Internet 14, and protects other devices indirectly connected via the firewall 101 to the Internet 14 from illegal access or the like. The moving-image-file shared server 106, the AVC conversion servers 107-1 and 107-2, and the monitoring servers 108-1 and 108-2 are each connected via the firewall 101 to the Internet 14.

The application servers 103-1 and 103-2 are connected via the load balancer 102 to the firewall 101. The load balancer 102 disperses loads applied to the application servers 103-1 and 103-2. The application servers 103-1 and 103-2 execute a process in response to a request from the client 11.

The application servers 103-1 and 103-2 are connected with the working server 104, and the working server 104 is connected with the database servers 105-1 and 105-2. The working server 104 executes a load dispersing process of the database servers 105-1 and 105-2. The database servers 105-1 and 105-2 hold the content received from the client 11, and search information composed of text such as a title, a key word, a comment, descriptive text, each of which corresponds to the content.

The AVC conversion servers 107-1 and 107-2 compress an image received from the client 11 in compliance with an AVC (Advanced Video Coding) format, and convert the resultant image into an AVC file. The moving-image-file shared server 106 connected to the AVC conversion servers 107-1 and 107-2 manage saving of the image received from each client 11.

The monitoring servers 108-1 and 108-2 are used for monitoring items of the content.

Figure 3:
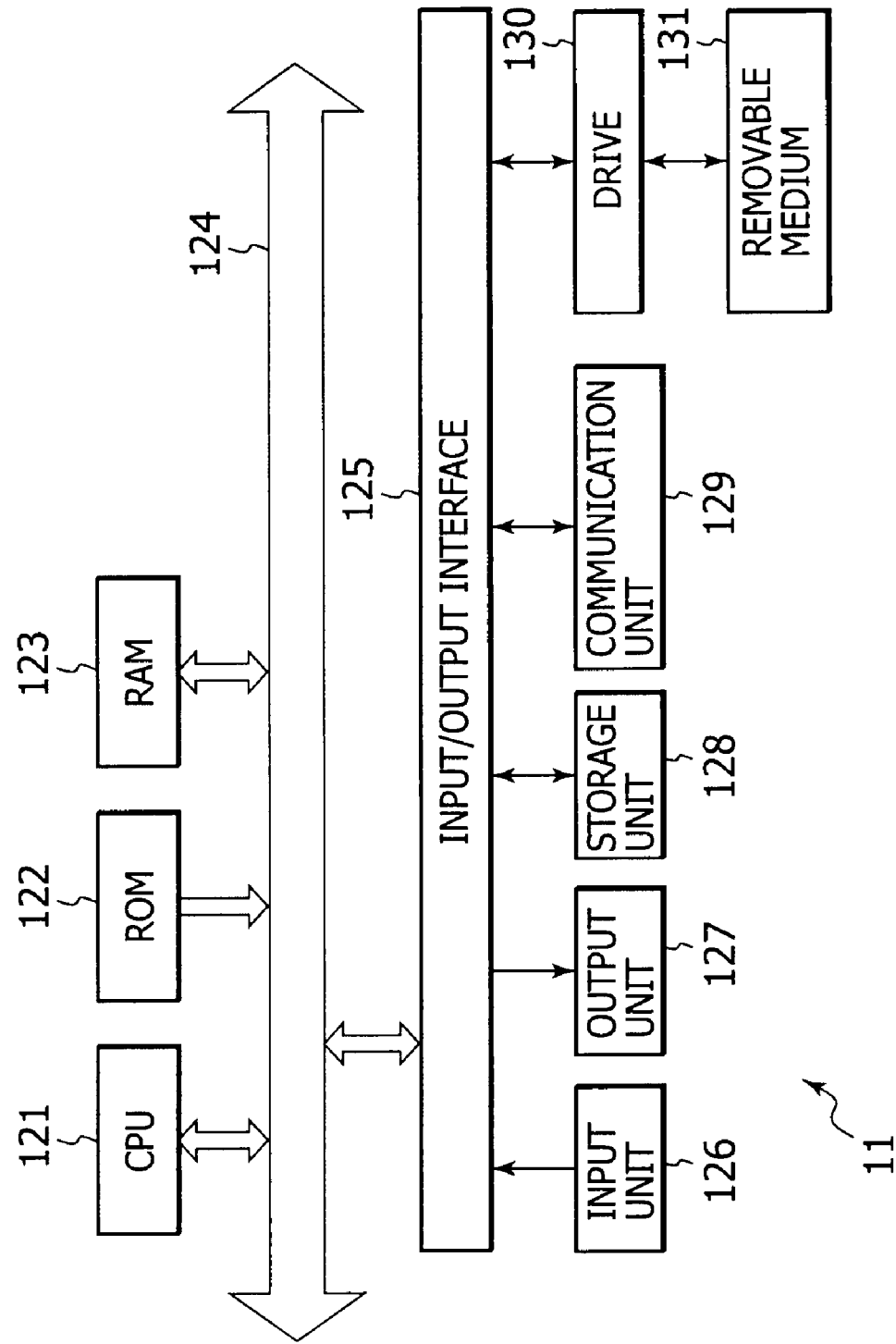
FIG. 3 is a block diagram showing a configuration of one embodiment of a client.

FIG. 3 is a block diagram showing a configuration of hardware of one embodiment of the client 11. A CPU (Central Processing Unit) 121 executes various processes according to a program stored in a ROM (Read Only Memory) 122 or a storage unit 128. A RAM (Random Access Memory) 123 appropriately stores the program, data or the like executed by the CPU 121. The CPU 121, the ROM 122, and the RAM 123 are connected to one another by a bus 124.

The CPU 121 is also connected via the bus 124 with an input/output interface 125. The input/output interface 125 is connected with an input unit 126 composed of a keyboard, a mouse, a microphone, or the like, and an output unit 127 composed of a display, a speaker, or the like. The CPU 121 executes various processes in response to a command inputted from the input unit 126. The CPU 121 outputs a process result to the output unit 127.

The storage unit 128 connected to the input/output interface 125 may be a hard disk, for example, and stores the program executed by the CPU 121 and various data. A communicating unit 129 communicates with an external device via a network such as the Internet, and a local area network. A program may be obtained via the communicating unit 129, and the obtained program may be stored in the storage unit 128.

Upon attachment of a removable medium 131 such as a magnetic disk, an optical disc, a magnet-optical disc, or a semiconductor memory, the drive 130 connected to the input/output interface 125 drives these components and obtains a program, data or the like stored thereon. The obtained program or data is transferred to the storage unit 128 as required and is stored therein.

A series of processes described later may be executed by hardware or executed by software. When the series of processes are executed by the software, a program constituting the software is installed from a program recording medium into a computer assembled in dedicated hardware or a general-purpose personal computer, for example, which becomes capable of executing various functions by installing therein various programs.

The program recording medium which houses a program installed in a computer and brought into an executable state by the computer may include: a removable medium 131 or packaged medium formed of a magnetic disk (including a flexible disk), an optical disc (including a CD-ROM (Compact Disc-Read Only Memory), a DVD (Digital Versatile Disc)), a magnet-optical disc, or a semiconductor memory or the like; the ROM 122 in which the program is temporary or permanently stored; and a hard disk constituting the storage unit 128, for example, as shown in FIG. 3. Housing of the program into the program recording medium is performed via the communication unit 129, which is an interface such as a router, a modem, or the like, as required, by utilizing a wired or wireless communication medium such as a local area network, the Internet, and a digital satellite broadcast.

Since other information processing apparatuses are similarly configured, configurations of other information processing apparatuses are also represented in FIG. 3.

Figure 4:
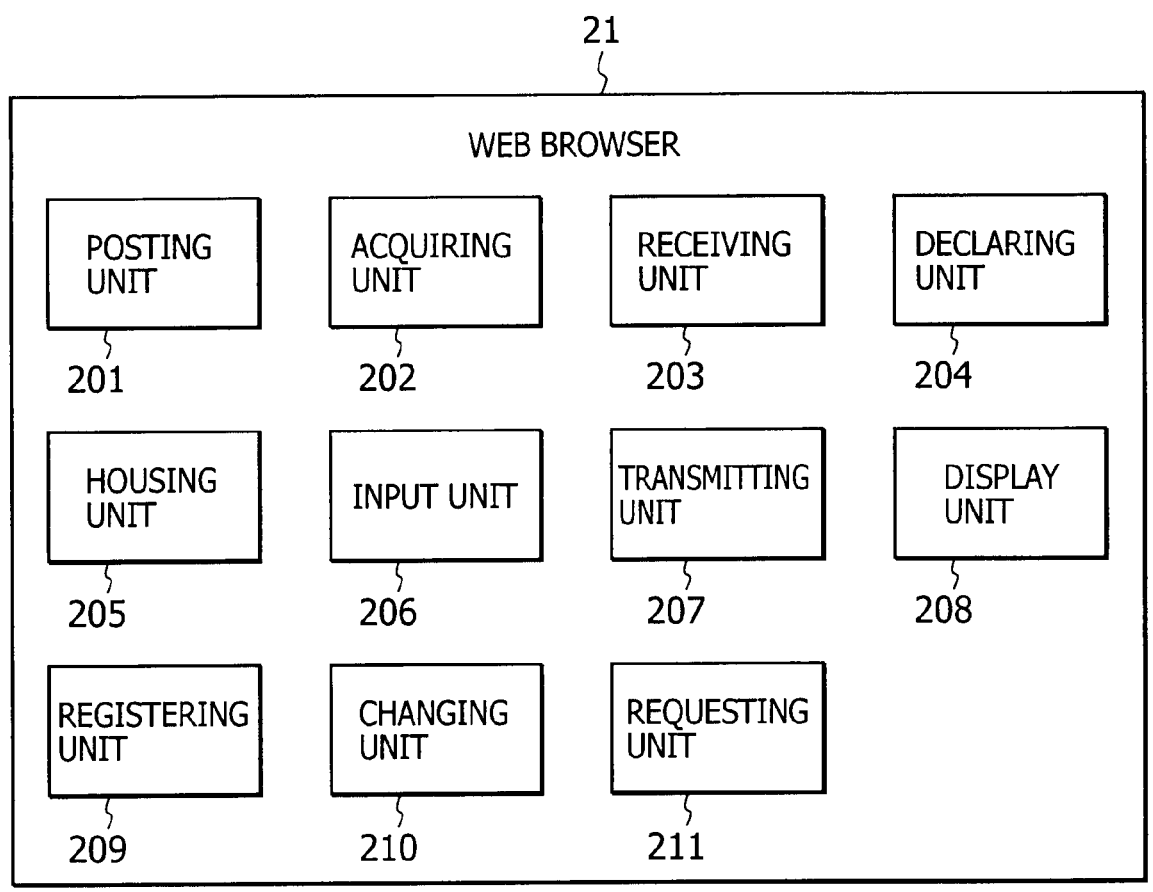
FIG. 4 is a block diagram showing a functional configuration of a Web browser.

FIG. 4 shows a functional configuration of one embodiment of the Web browser 21. A posting unit 201 posts content and search information corresponding thereto to the posting server 12. An acquiring unit 202 accesses the posting server 12 to acquire a moving image page. A transmitting unit 207 and a receiving unit 203 transmit and receive information to and from the other devices.

A declaring unit 204 declares to the application server 103 that a copyright of the content offered by each user is owned by each user, downloading of the content is permitted to other users free of charge or with a fee, and so on. A housing unit 205 houses the AVC file received from the application server 103. An input unit 206 inputs a search condition according to a user operation.

A display unit 208 controls a display on a screen. A registering unit 209 registers the search condition or information specifying the search condition as a dynamic channel. A changing unit 210 changes a playback order of content. A request unit 211 requests to download the content.

Figure 5:
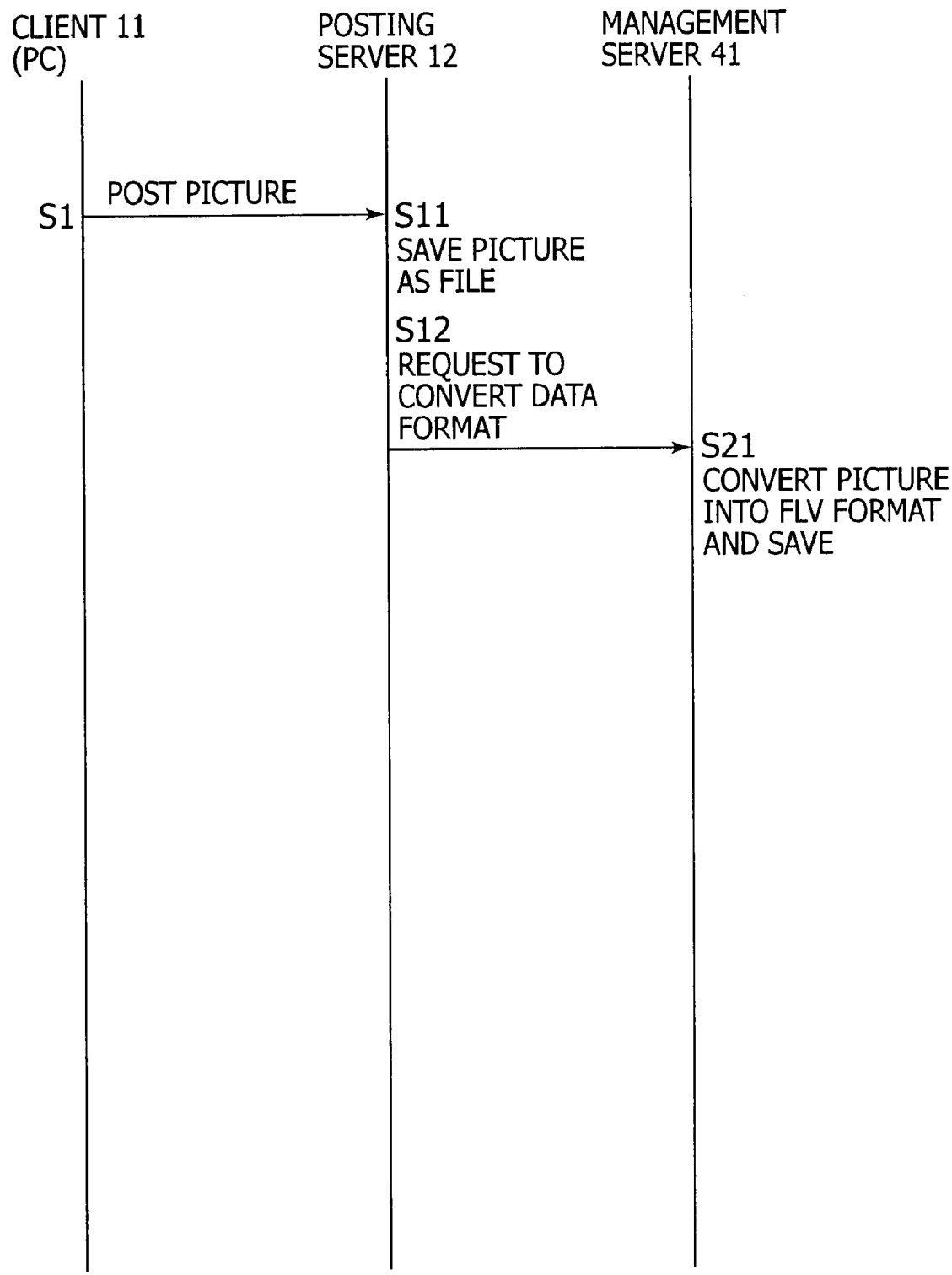
FIG. 5 is a flowchart for describing a process in which an image is posted.

Subsequently, with reference to a flowchart in FIG. 5, a process in which a user who uses a personal computer posts to the posting server 12 a moving image which is content shared by another user is described. When utilizing a service provided by the management server 41, each user completes a user registration in advance and provides to the management server 41 necessary information about the user him/herself. In the following description, descriptions about operations of the firewall 101, the load balancer 102, and the working server 104 are appropriately omitted.

In step S1, a user of the client 11, which may be a personal computer, selects a moving image shared by another user, and instructs the Web browser 21 to post the image. That is, the posting unit 201 of the Web browser 21 accesses via the Internet 14 a Web site offered by the application server 103 according to the instruction by the user. When a predetermined operation is performed by the user in accordance with the display indication, the posting unit 201 posts the image selected by the user to the posting server 12. More specifically, the moving image selected by the user is transmitted via the Internet 14 to the posting server 12 by an HTTP (Hypertext Transfer Protocol) method of POST, together with attached information made of text such as a title, a keyword, a comment, descriptive text, which is added by the user to the moving image. A whole or part of the attached information is used to search the moving image, and therefore, in this sense, it is search information.

In step S11, the posting server 12 saves the image received from the client 11 as a file. That is, the database server 105 saves the moving image inputted via the firewall 101, the load balancer 102, the application server 103, and the working server 104, together with the attached information corresponding to the moving image.

In step S12, the application server 103 requests the management server 41, via the Internet 14, to convert a data format of the moving image which is just now received and saved. In the management server 41, the conversion server 31 constituting the content providing server 13 converts the image into an FLV format and saves it in step S21. That is, the conversion server 31 converts the moving image, together with the attached information, transmitted from the posting server 12, into the FLV format which is common to all users, and causes the database server 32 to save the converted moving image and the attached information. Thus, the moving image provided by one user who uses the personal computer is now prepared as a file which may be shared by another user who uses a personal computer.

Figure 6:
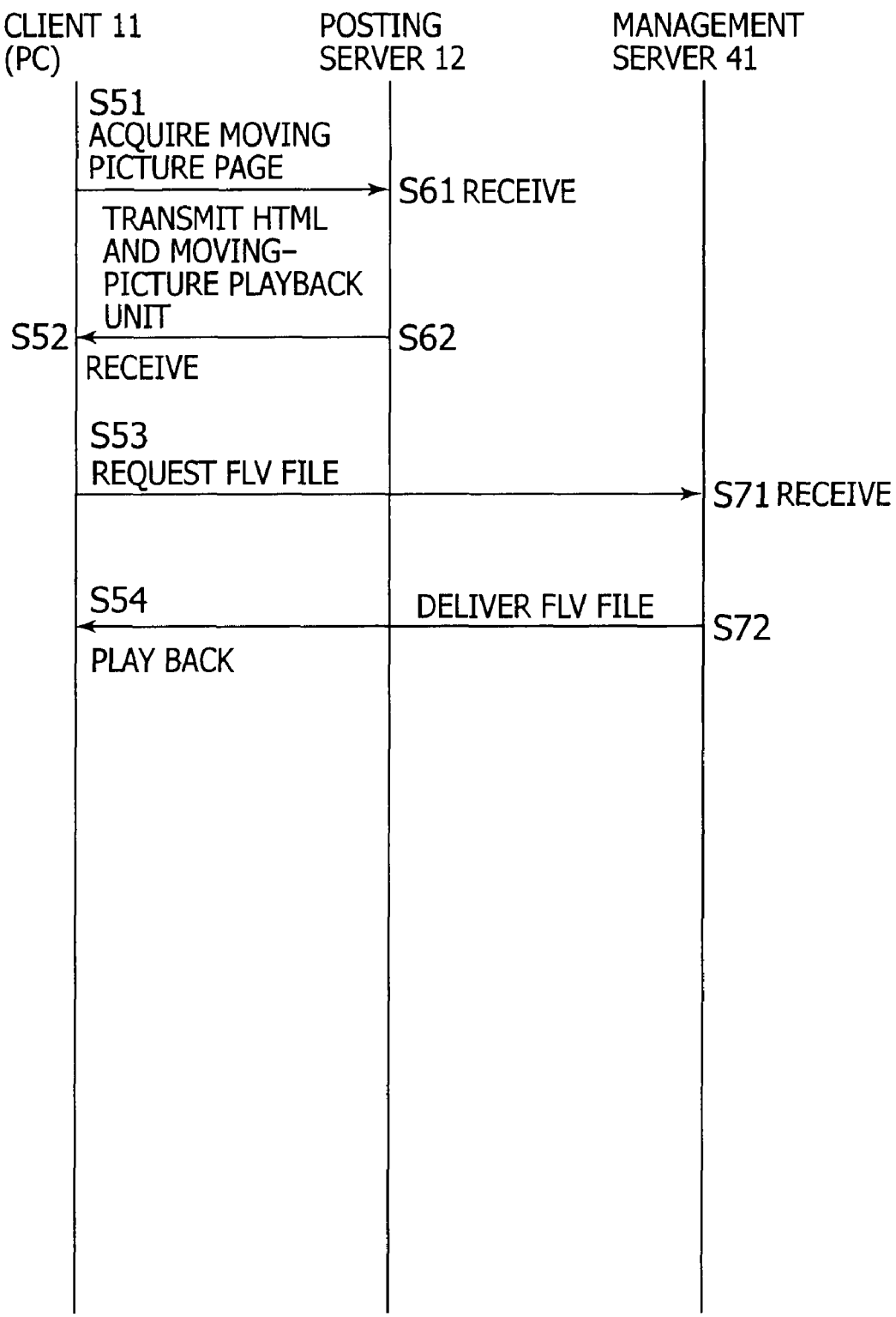
FIG. 6 is a flowchart for describing a process in which the posted image is viewed.

Subsequently, a process when the moving image thus posted by one user to the posting server 12 is viewed by another user is described with reference to a flowchart in FIG. 6.

In step S51, the acquiring unit 202 of the Web browser 21 accesses the application server 103 of the posting server 12 to acquire the moving image page. The moving image page is a page on which one moving image is selected and designated out of a plurality of moving images. On this moving image page, the user designates a moving image which the user desires to view. Upon receipt of a designation of the moving image in step S61, the application server 103 transmits an HTML (Hypertext Markup Language) and the moving-image playback unit 22 to the client 11 in step S62. In the HTML, a URL (Uniform Resource Locator) which is link-destination information for acquiring a moving image or a thumbnail, a Java Script (registered trademark) code for performing a scroll process, or the like are written. The moving-image playback unit 22 is a moving image player for playing back the moving image.

When the moving-image playback unit 22 is provided from a management server 41 side, it becomes possible not only to eliminate a problem for the user to install the unit on his or her own, but this also provides the user with the moving-image playback unit 22 having the latest functions.

The receiving unit 204 receives the HTML and the moving-image playback unit 22 in step S52. In step S53, the moving-image playback unit 22 requests the FLV file of the subject-to-playback moving image which is designated at the step S51 to the content providing server 13. At this time, the client 11 only links to the URL designated from the posting server 12, and thus, the client 11 does not notice that the URL is linked to the FLV file held by the database server 32 of the content providing server 13 and the user recognizes that the user accesses the posting server 12. Accordingly, even when the posting server 12 and the content providing server 13 having the delivery server 33 are managed by different business entities, inconvenience to the user is prevented.

Upon receipt of the request from the client 11 in step S71, the delivery server 33 of the content providing server 13 reads out the designated FLV file from the database server 32 and delivers the read FLV file in a streaming manner to the client 11 in step S72. In step S54, upon receipt of the delivered FLV file, the moving-image playback unit 22 plays back the received FLV file.

Thus, the moving image posted by a single user who uses the client 11, which is the personal computer, is shared by another user of the personal computer.

Figure 7:
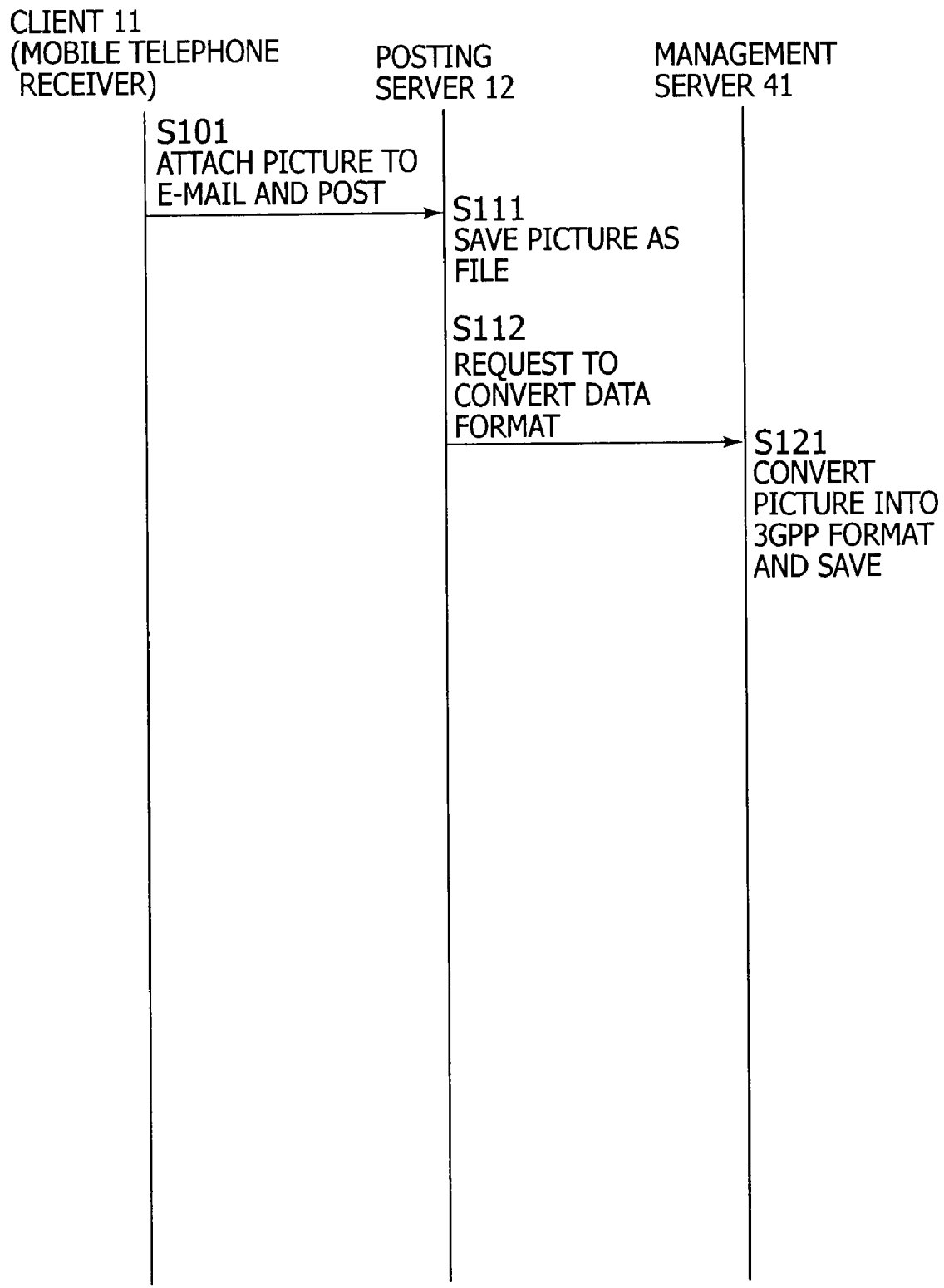
FIG. 7 is a flowchart for describing another process in which an image is posted.

A similar operation is also performed when the user uses the client 11 which is a mobile telephone receiver. FIG. 7 is a flowchart for describing a registering process of an image in this case.

In step S101, in accordance with the instruction of the user, the posting unit 201 of the Web browser 21 accesses a Web site provided by the application server 103. When a predetermined operation is performed by the user in accordance with the display indication, the posting unit 201 attaches the moving image selected by the user to an electronic mail and posts it to the posting server 12. At this time, attached information such as a title, a keyword, a comment, descriptive text which is added by the user to the moving image is also transmitted to the posting server 12.

In step S111, the posting server 12 saves the image received from the client 11 as a file. That is, the database server 105 saves the inputted image together with the corresponding attached information.

In step S112, the application server 103 requests the management server 41, via the Internet 14, to convert a data format of the image which is just now received and saved. In the management server 41, the conversion server 31 constituting the content providing server 13 converts the image into a 3GPP format and saves the converted image in step S121. That is, the conversion server 31 converts the image transmitted, together with the attached information, from the posting server 12 into the 3GPP format which is a format common to every user who uses the client 11 or mobile telephone receiver, and causes the database server 32 to save the formatted image and attached information. Thus, the moving image provided by the single user who uses the mobile telephone receiver may be shared by another user who uses the mobile telephone receiver.

Figure 8:
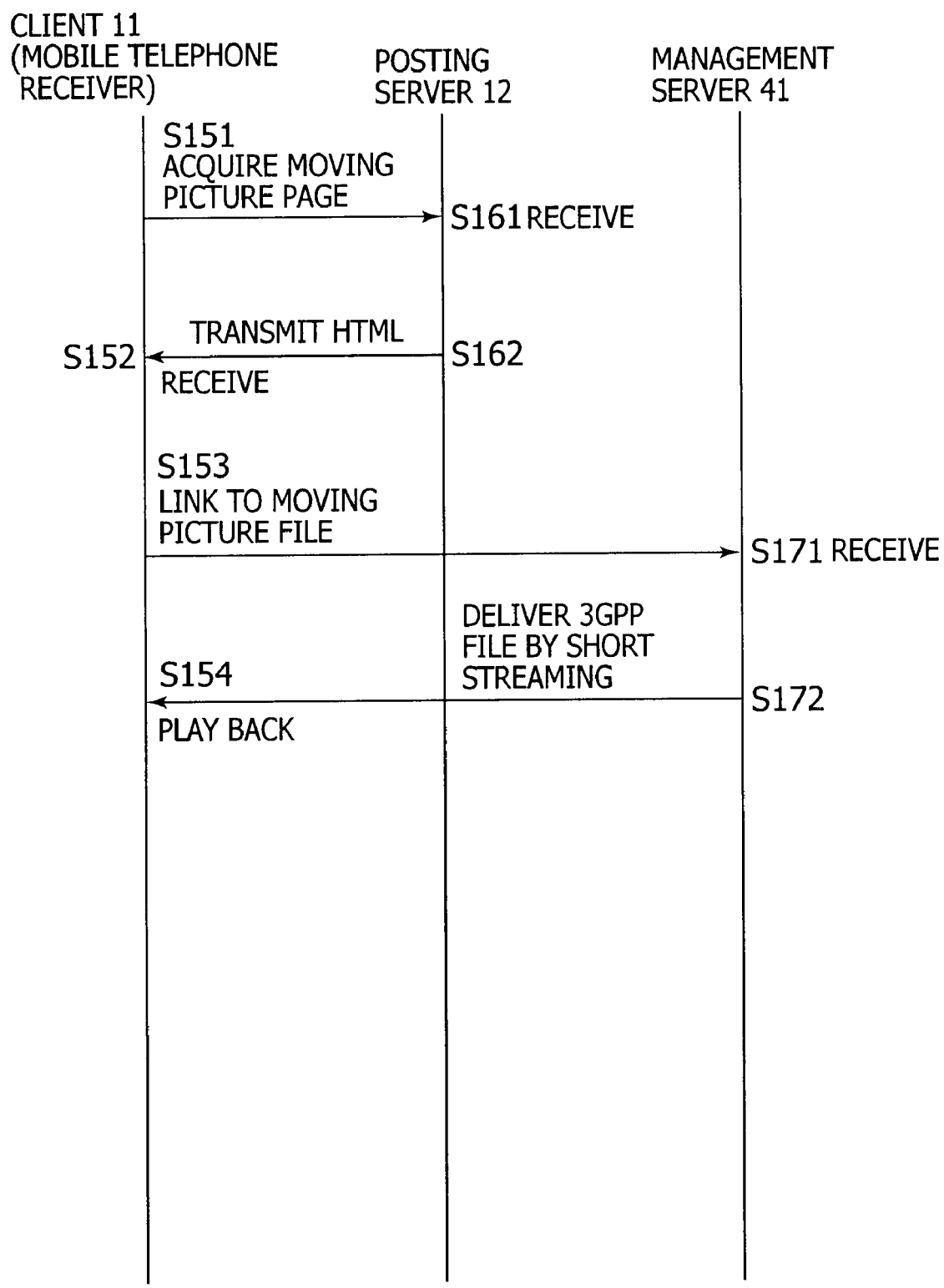
FIG. 8 is a flowchart for describing another process in which the posted image is viewed.

Subsequently, with reference to a flowchart in FIG. 8, a description is given of a process when the moving image posted by the single user as described above to the posting server 12 is viewed by another user.

In step S151, the acquiring unit 202 of the Web browser 21 accesses the application server 103 of the posting server 12 to acquire the moving image page. On this moving image page, the user designates a moving image which the user desires to view. Upon receipt of the designation of the moving image data in step S161, the application server 103 transmits the HTML to the client 11 in step S162. In the HTML, a URL which is link destination information for acquiring the moving image and a thumbnail, a Java Script (registered trademark) code for performing a scroll process, or the like are written. The client 11 or mobile telephone receiver by itself includes the moving-image playback unit 22, and thus, in this case, the moving-image playback unit 22 is not transmitted.

When the receiving unit 204 receives the HTML in step S152, in step S153, the moving-image playback unit 22 links to the URL of the 3GPP file of the image designated in step S151. The URL designates the 3GPP file held in the database server 32 of the content providing server 13.

In step S171, upon receipt of a request from the client 11, the delivery server 33 reads out the designated 3GPP file from the database server 32 in step S172, and delivers the designated 3GPP file to the client 11 in a short streaming manner. In step S154, the moving-image playback unit 22 plays back and displays the image of the delivered 3GPP file.

As described above, the image posted by the single user who uses the client 11 or mobile telephone receiver is shared by another user of the mobile telephone receiver.

Figure 9:
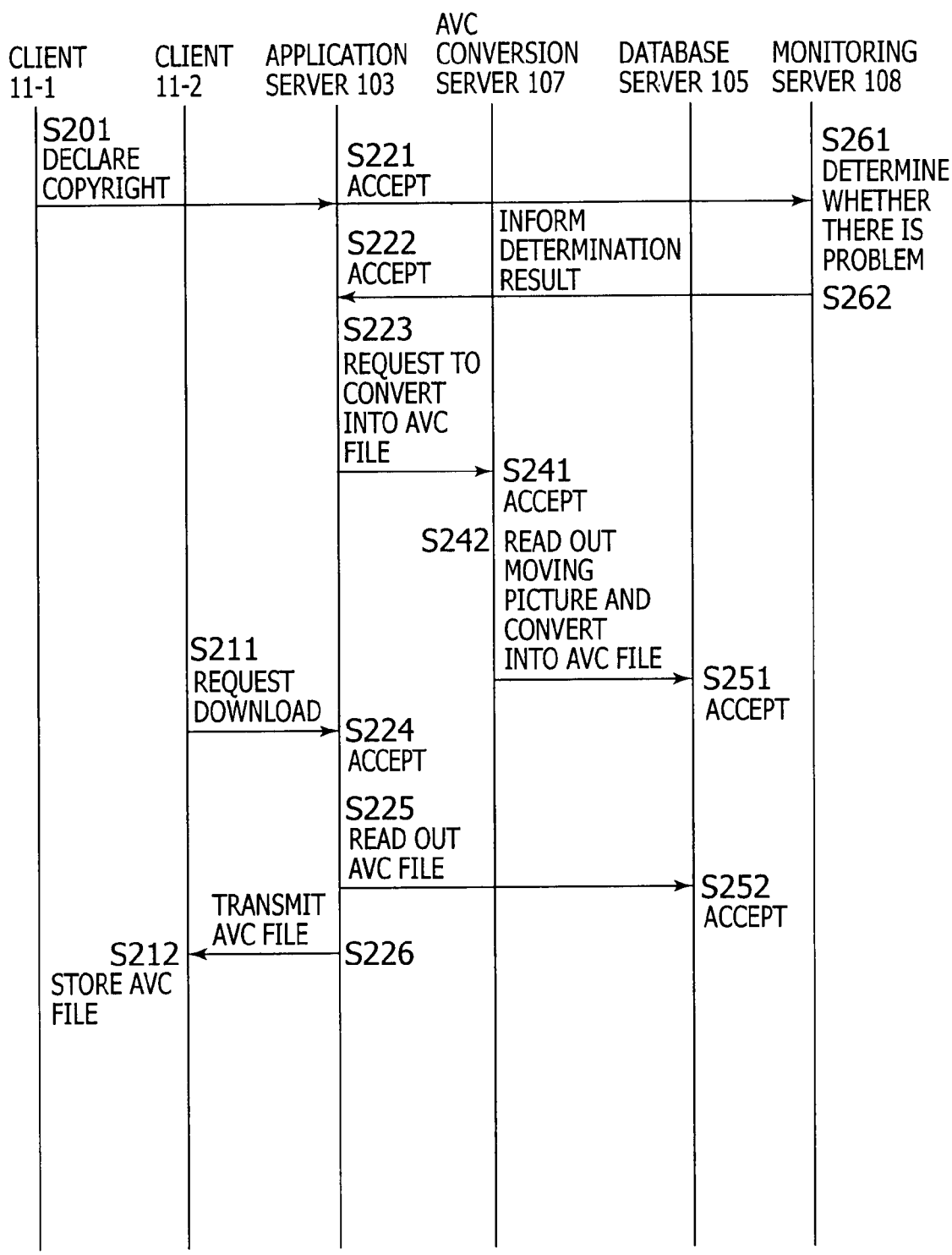
FIG. 9 is a flowchart for describing a process in which another user downloads the posted image.

In the above-described process, the image is delivered in a streaming manner, and thus, the client 11 cannot save the image. In the information processing system 1, when the content provided by the single user who utilizes the personal computer is downloaded and saved by another user, a process shown in a flowchart in FIG. 9 below is performed.

In step S201, in response to an instruction of a user who permits another user to save, a declaring unit 204 of the client 11-1 of the user declares a copyright protection. That is, Creative Commons, which is a non-profit organization, provides a framework for making certain that a copyrights of content published on the Web by a provider of the content are not violated. The provider of the content creates metadata attached to the content, and can allow publication of the content free of charge. The user creates metadata for allowing publication of the content free of charge, and transmits the metadata to the posting server 12. The image accompanied by the metadata is already saved in the database server 105 by the process shown in the flowchart of FIG. 5.

Upon receipt of the metadata in step S221, the application server 103 further transmits the metadata to the monitoring server 108. In step S261, upon receipt of the metadata, the monitoring server 108 determines whether there is a copyright violation based on the image written in the metadata. At this time, the monitoring server 108 also checks whether the items of the content are obscene or socially inappropriate. In step S262, the monitoring server 108 informs the application server 103 of a determination result.

Upon receipt of the determination result in step S222, the application server 103 requests the AVC conversion server 107 to convert the image written in the metadata into the AVC file in step S223 when the determination results indicates that there is no copyright problem. In step S241, upon receipt of the request, the AVC conversion server 107 reads out the image written in the metadata from the database server 105 and converts the read data into the AVC file in step S242. The generated AVC file is housed in the database server 105.

As a result of these processes, the file of the image which may be downloaded and saved by another user is now prepared.

Therefore, in step S211, another user designates a predetermined image and instructs to download that image. Based on the instruction, the requesting unit 211 of the client 11-2 requests the posting server 12 to download the designated image. Upon receipt of the request in step S224, the application server 103 reads out the AVC file of the designated image from the database server 105 in step S225. In step S252, the database server 105 which accepts the reading-out request outputs the AVC file.

In step S226, the application server 103 transmits the read-out AVC file to the client 11-2 which has requested the download. In step S212, the housing unit 205 of the client 11-2 houses the received AVC file. The AVC file is housed in a portable electronic appliance such as PlayStation Portable, WALKMAN, iPod (each of which is a registered trademark), for example.

When the image which is requested to download has a problem in the determination result or the like regarding the copyright, the application server 103 does not request the AVC conversion server 107 to convert into the AVC file at the step S223. Accordingly, the AVC file is neither generated nor saved. Consequently, in this case, the application server 103 informs the client 11-2 that no image is provided.

As described above, since only socially acceptable content is shared and saved among a plurality of users, it is possible to construct a socially sound system.

When the client 11 is the mobile telephone, since the mobile telephone itself is designed not to save the content therein, the content may not be saved. However, when the design specification is changed, it becomes possible to save the content.

In the information processing system 1, by utilizing the attached information such as a title, a keyword, a comment, descriptive text, the content may be searched. Therefore, a process in which the content is searched is described next with reference to a flowchart in FIG. 10.

A user who intends to search an image operates a keyboard or the like to input a character string for searching which probably accompanies the image for which the user desires to search. In accordance with the user operation, the input unit 206 inputs a search condition in step S301. The search condition includes a logical AND and a logical OR, each of which includes the letter string for searching of any number, or a combination of these, or the like.

Figure 11:
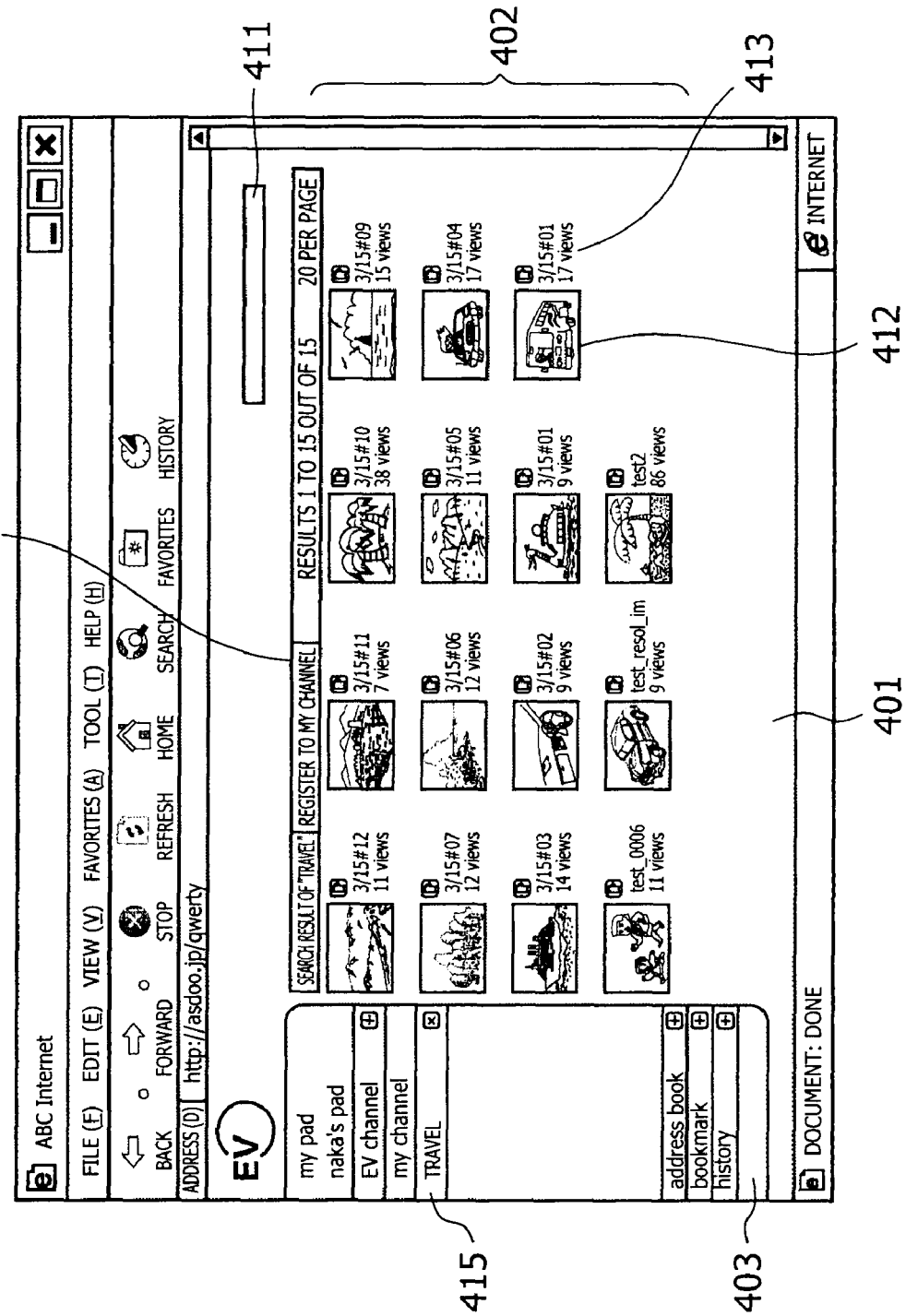
FIG. 11 is a diagram showing a state where the search result is displayed.

FIG. 11 illustrates one embodiment of a screen displayed on the display of the client 11 when the search process is performed. An upper right of a screen 401 is formed with a condition input unit 411 in which the user inputs the search condition.

In step S302, the transmitting unit 207 transmits the search condition inputted at the step S301 to the posting server 12. In step S321, the application server 103 of the posting server 12 searches a moving image matching the search condition. More specifically, a character string matching the character string for searching is searched in the attached information or searching information, such as a title, a keyword, a comment, descriptive text, held in the database server 105. An image which corresponds to the search information including the matched letter string is retrieved as the image matching the search condition.

In step S322, the application server 103 creates a list of retrieved images. On this list, a thumbnail of a representative screen of the image and the attached information are written. As the representative screen, when there is a screen designated by the user, that screen is used, and otherwise a head screen is used, for example. In step S323, the application server 103 transmits the created list to the client 11.

The thumbnail is information symbolizing the moving image for allowing the user to visually confirm the corresponding moving image, and instead of the thumbnail, a title of the image, a comment thereof, descriptive text thereof, or the like, may be used as the symbolized information. However, when the thumbnail is used, it becomes easier to symbolize the content of the moving image, and hence the thumbnail is preferable.

The receiving unit 203 of the Web browser 21 receives the list in step S303. In step S304, the display unit 208 displays the thumbnail included in the received list. At this time, at least one portion of the attached information attached to the thumbnail is also displayed. FIG. 11 shows a state where a thumbnail 412 and attached information 413 corresponding to the thumbnail 412 are displayed on a display unit 402 of the screen 401.

In this state, the user may select the desired thumbnail 412. When the user selects the thumbnail, the corresponding URL is accessed, and the corresponding moving image is played back. That is, a playback in this case is not automatically performed, and the thumbnail 412 needs to be selected at each time.

The user may repeatedly view content composed of a plurality of moving images retrieved (obtained as a result of searching) as if the content were a single program. When the user desires to view the content repeatedly, the user operates an addition button 414 displayed at an upper approximate center of the display unit 402. When the addition button 414 is operated by the user, the registering unit 209 registers a search condition under which the search result displayed on the display unit 402 at this time is obtained, or information specifying the search result, as a dynamic channel in step S305. In step S306, the display unit 208 displays the registered dynamic channel. That is, as shown in FIG. 11, a dynamic channel 415 is displayed on a display unit 403 in a left side of the screen 401. An arbitrary name may be assigned to the dynamic channel in consideration of a search condition by the user, and so on. In the case of the embodiment, a name of "travel" is assigned.

In step S307, the requesting unit 211 requests the posting server 12 to save the search condition. When the user does not perform the registration as the dynamic channel, it is meaningless for the posting server 12 to save the search condition. Thus, this process is performed when the registering process of the dynamic channel is performed in step S305.

In step S324, the application server 103 saves the search condition corresponding to the user in response to the request from the client 11.

As described above, from this moment onward, the user who saves the search condition as the dynamic channel may view the dynamic channel as if it were one program. Subsequently, a process in this case is described with reference to flowcharts in FIG. 12 and FIG. 13.

When the user desires to view the dynamic channel, the user performs an operation for designating and selecting a dynamic channel which the user desires to view. When this operation is performed, the input unit 206 inputs a selection of the dynamic channel in step S431 in FIG. 12. In step S432, the transmitting unit 207 transmits a request to acquire a moving image included in the dynamic channel. More specifically, information for specifying the search condition performed by the user in the past is transmitted. That is, the search condition itself is already saved in the process at the step S324 in FIG. 10, and thus, in this case, it suffices to transmit information for specifying the search condition, such as an identification number for specifying the search condition.

In step S461, the application server 103 of the management server 41 searches a moving image matching the search condition saved at the step S324 in FIG. 10. That is, based on the information for specifying the received search condition, the application server 103 specifies the saved search condition of the user, and uses that search condition to execute another search process similar to that at the step S321 in FIG. 10. There is a case where a time is lapsed in a period during which the dynamic channel is registered and viewing of the dynamic channel is requested. In this case, the database server 105 is registered with a new image during that period. At each request of viewing the dynamic channel, the database server 105 performs the search at each time. Thus, it becomes possible to provide a latest content to the user.

Instead of registering the search condition on a management server 41 side, the search condition may be saved in a manner to correspond to the dynamic channel on a client 11 side, and the search condition itself may be transmitted to the management server 41 side at each time playback of the dynamic channel is requested.

In step S462, the application server 103 creates a list of retrieved images, and transmits the list to the client 11 in step S463.

Figure 14:
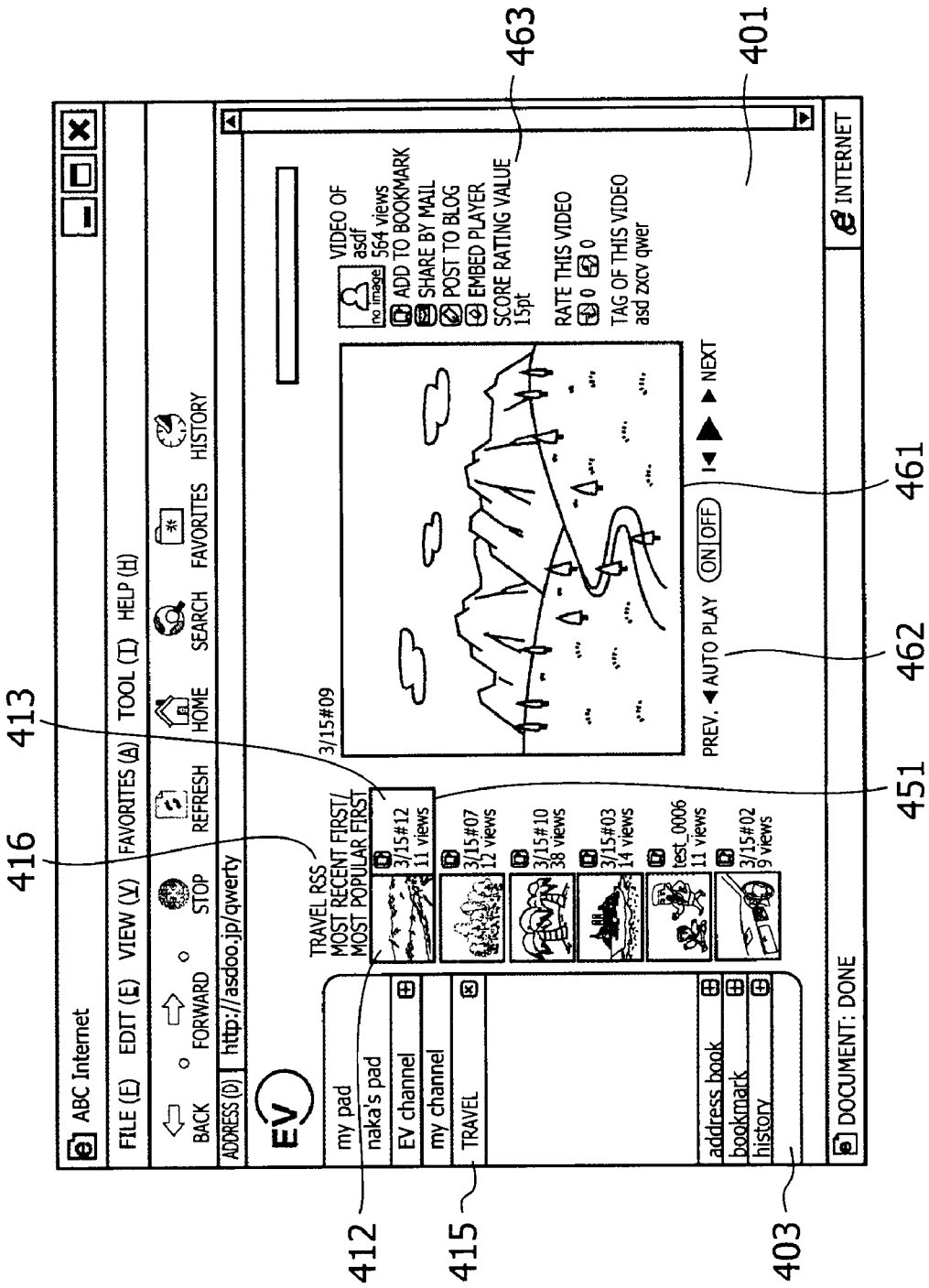
FIG. 14 is a diagram for describing a playback state of a moving image.

In step S433, when the receiving unit 203 receives the list, the display unit 208 displays the thumbnail of the moving image in step S434. FIG. 14 shows a state where the thumbnail 412 is thus displayed on a right side of the display unit 403. When the user selects either one of displays of "most recent first/most popular first" on the display unit 416, the user may change the order of the displayed thumbnails. When the "most recent first" is selected, the thumbnail 412 is adapted such that an image which is saved recently is displayed at a higher position, and an image which is saved on an old date and time is displayed at a lower position. When the "most popular first" is selected, the thumbnail 412 is displayed such that the thumbnail of which the number of search made in the past is larger is placed at a higher position. An order of display represents an order of playback, and a process described later starts the playback from an image corresponding to a thumbnail displayed on a higher position in a sequential manner.

In step S435, the requesting unit 211 requests the moving-image playback unit 22 to play back a head image on the list. That is, the playback of a moving image corresponding to the thumbnail displayed at the uppermost position is requested. This request is accompanied by the URL representing a location at which the moving image exists. At this time also, the display unit 208 causes a cursor 451 to appear at a position which corresponds to the thumbnail 412 located at the uppermost position, as shown in FIG. 14. When the cursor 451 is displayed on the thumbnail corresponding to the image being played back, the user may easily confirm the image which is currently played back.

Upon receipt of the request in step S401, based on the received URL in step S402, the moving-image playback unit 22 requests the FLV file to be played back. The URL represents the image saved in the database server 32 of the management server 41, and thus the delivery server 33 is accessed. Upon receipt of the request in step S464, the delivery server 33 reads out the FLV file designated by the URL from the database server 32 and transmits the FLV file to the client 11 in step S465.

Upon receipt of the FLV file in step S403, the moving-image playback unit 22 plays back the FLV file in step S404. As a result, as shown in FIG. 14, the moving image of the FLV file is displayed on a display unit 461 of the screen 401 in a state where the thumbnail 412 is displayed. Below the display unit 461, an operation unit 462 is displayed. When the user operates the operation unit 462 as required, the user may stop, start, and rewind an automatic playback, start the playback, control a sound volume, and so on. A display unit 463 on a right side of the display unit 461 is displayed with, besides information such as a title of the image, or the like, function buttons for adding the image to a bookmark, sharing the image by e-mail, posting the image in a blog, embedding a player, and evaluating the image. On the display unit 463, a score, a tag, a URL, or the like, of the image are further displayed.

In step S405, upon completion of the playback, the moving-image playback unit 22 requests the Web browser 21 of information of a moving image to be played back next. When the request is received by the receiving unit 203 in step S436, a cursor movement and a scroll process are executed in step S437. A detail of the process is shown in FIG. 13.

In step S481 in FIG. 13, the display unit 208 determines whether an image of a last thumbnail is played back. When the playback of the image of the last thumbnail is completed, the playback process is ended. When the image of the last thumbnail has not yet been played back, the display unit 208 determines whether there is a thumbnail to be newly displayed in step S482. In a case of the embodiment, as shown in FIG. 14, a maximum of six thumbnails may be displayed. In most cases, the number of images included in the dynamic channel in which the search result is registered greatly exceeds six. In that case, it is determined that there is the thumbnail to be newly displayed in step S482. In step S483, the display unit 208 determines whether the cursor is displayed at a predetermined position. In this embodiment, a predetermined position which is previously determined is set to a third thumbnail from an uppermost thumbnail. Thus, by the time that the playback of a first image is completed, the cursor has not yet been displayed at the predetermined position.

Figure 15:
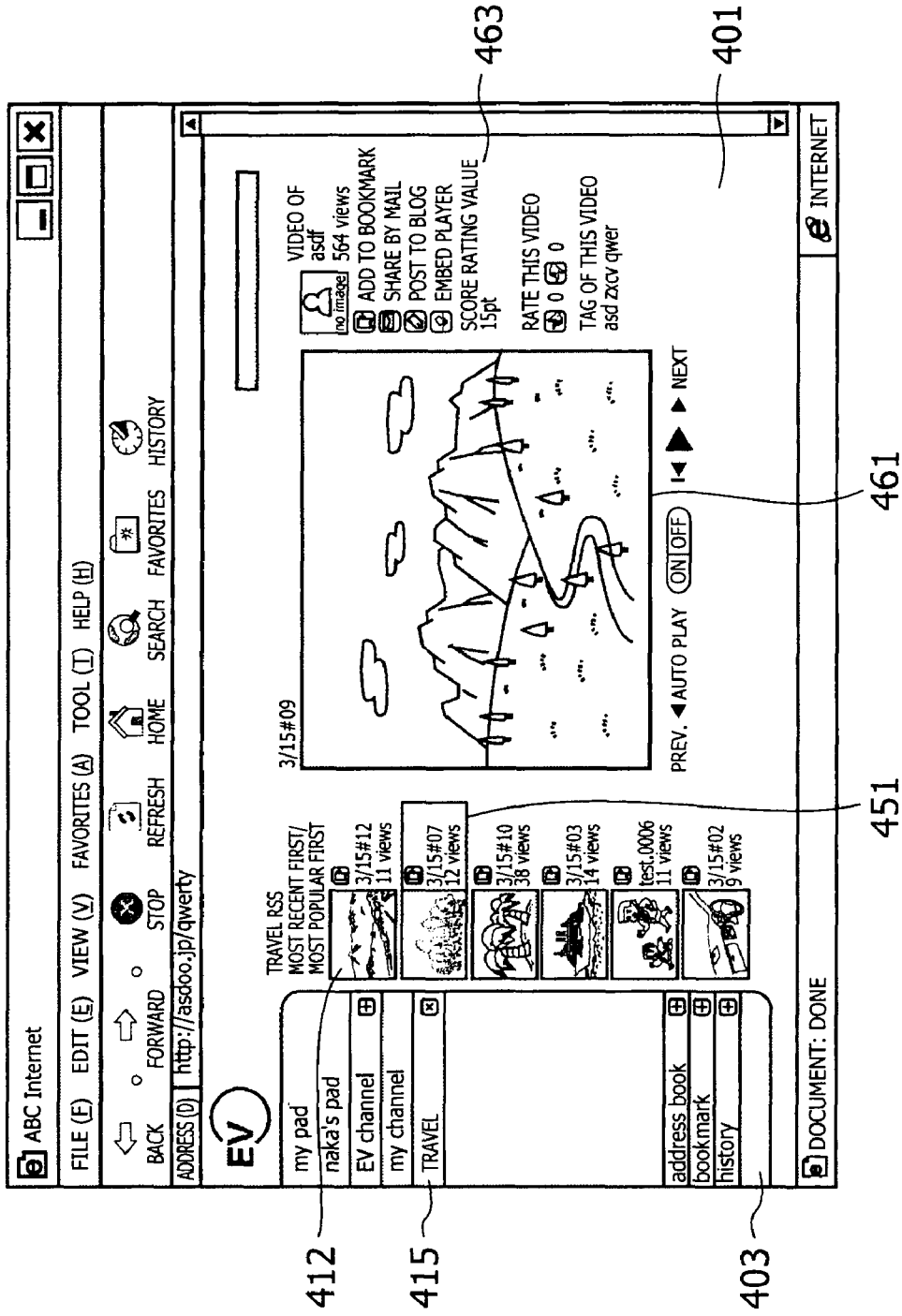
FIG. 15 is a diagram for describing another playback state of the moving image.

In this case, in step S484, the display unit 208 moves a cursor 451 onto a next lower thumbnail. At this moment, as shown in FIG. 15, the cursor 451 is moved onto a second thumbnail from the uppermost thumbnail. At subsequent step S486, the display unit 208 sets an image of the thumbnail at which the cursor is positioned to the image to be played back next.

Returning to FIG. 12, in step S438, the display unit 208 transmits to the moving-image playback unit 22 information about the moving image to be played back next, which is determined at the step S486 in FIG. 13. In this case, information, such as a URL, for example, necessary for acquiring the image which corresponds to the second thumbnail from the uppermost thumbnail is transmitted.

Upon receipt of the URL in step S406, the moving-image playback unit 22 returns the process to the step S402. That is, at the step S402, based on the designated URL, the moving-image playback unit 22 requests the delivery server 33 of an FLV file to be played back. Upon receipt of the request in step S464, the delivery server 33 reads out the FLV file of the designated URL from the database server 32 and transmits the read FLV file to the moving-image playback unit 22 in step S465.

Upon receipt of the FLV file in step S403, the moving-image playback unit 22 plays back the image in step S404. Thus, as shown in FIG. 15, a second moving image is displayed on the display unit 461.

When the playback of the second image is completed in step S405, the moving-image playback unit 22 requests the display unit 208 of the information of the moving image to be played back next.

Figure 16:
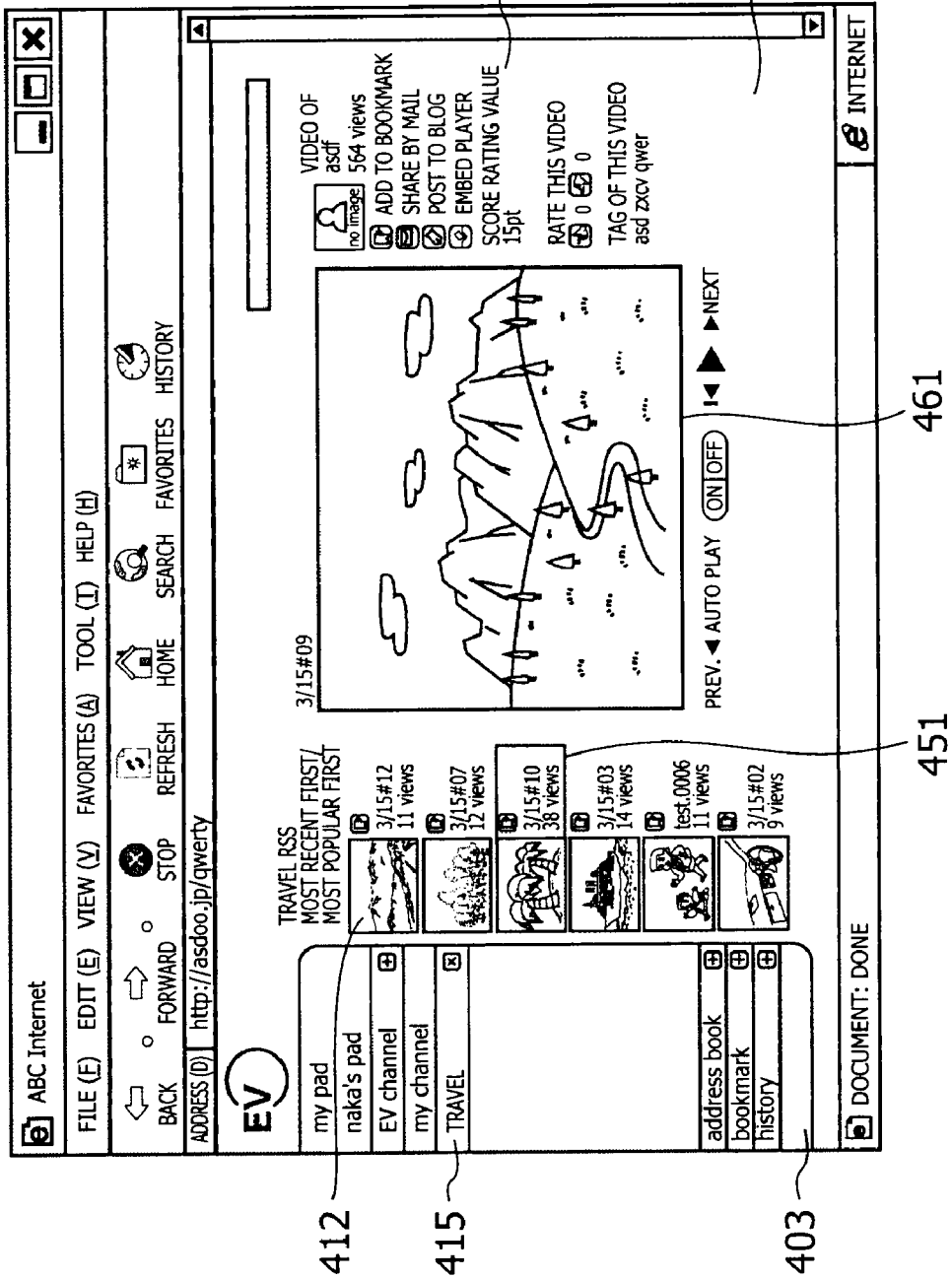
FIG. 16 is a diagram for describing still another playback state of the moving image.

Upon receipt of the request in step S436, the display unit 208 executes again the cursor movement and the scroll process in step S437. In step S481 in FIG. 13, it is determined whether the image of the last thumbnail is played back. At this time, the image of the last thumbnail is not yet played back, and thus, it is determined whether there is a thumbnail to be newly displayed in step S482. Now there is the thumbnail to be newly displayed, and thus, it is determined whether the cursor is displayed at the predetermined position in step S483. At this time, the cursor is not yet displayed at the predetermined position (the cursor is currently displayed at a position of the second thumbnail 412 from the uppermost thumbnail), and thus, the cursor 451 is moved onto a next lower thumbnail 412 in step S484. Thus, as shown in FIG. 16, for example, the cursor 451 is moved to a position of a third thumbnail 412 from the uppermost thumbnail. That is, as a result, the cursor 451 is moved to the predetermined position.

Then, in step S486, an image of the third thumbnail 412 from the uppermost thumbnail is set as the image to be played back next. In step S438 in FIG. 12, as information about the image to be played back next, information about the image of the third thumbnail 412 from the uppermost thumbnail is transmitted to the moving-image playback unit 22.

The moving-image playback unit 22 which receives this information at the step S406 returns the process to the step S402. The moving-image playback unit 22 requests an FLV file of an image corresponding to the third thumbnail 412 from the uppermost thumbnail at the step S402 to the delivery server 33, and when the FLV file is transmitted, the moving-image playback unit 22 plays it back at the step S404. That is, a moving image of the third thumbnail 412 from the uppermost thumbnail is played back. Upon completion of the playback, at the step S405, when the moving-image playback unit 22 requests the information about the moving image to be played back next, the display unit 208 executes the cursor movement and the scroll process of FIG. 13 again in step S437.

In step S481 in FIG. 13, it is determined that the image of the last thumbnail has not yet been played back, and it is determined whether there is a thumbnail to be newly displayed in step S482. In this case, since there is the thumbnail to be newly displayed, it is determined whether the cursor is displayed at the predetermined position in step S483. Since the cursor is currently displayed at a position of the third thumbnail 412 from the uppermost thumbnail, which is the predetermined position, and thus, the display unit 208 scrolls the thumbnail in step S485. More specifically, since six thumbnails 412, from first to sixth thumbnails in a playback order, are currently displayed, the thumbnails are collectively moved upwardly by each thumbnail. This results in a state where six thumbnails 412, from second to seventh thumbnails, are displayed. As a result, there is established a state where the fourth thumbnail 412 is displayed at the position at which the third cursor 451 from the uppermost cursor, which is the predetermined position, is displayed. Accordingly, in step S486, the fourth thumbnail 412 is set as the image to be played back next.

Hereinafter, when similar processes are repeated, the thumbnail 412 is automatically and sequentially scrolled upwardly at each time that the playback is complete. As a result, when the playback of the moving image of the fourth thumbnail 412 from the last thumbnail is complete, it is determined that there is no thumbnail to be newly displayed in step S482 in FIG. 13. In step S484, the cursor 451 is moved to a position of a next lower thumbnail. In this case, the cursor 451 is moved to a position of the fourth thumbnail 412 from the uppermost thumbnail. Thus, in step S486, an image of the third thumbnail 412 from the last thumbnail is set to the image to be played back next.

Upon completion of the playback of the third moving image from the last, it is determined that the image of the last thumbnail has not yet been played back in step S481, and thus, it is determined that there is no thumbnail to be newly displayed in step S482. Accordingly, in step S484, the cursor 451 is moved to a lower position only by one thumbnail. In this case, the cursor 451 is moved to a position of the fifth thumbnail from the uppermost thumbnail. Thus, in step S486, an image of the second thumbnail from the last thumbnail is set as the image to be played back next.

As described above, the cursor 451 is moved downwardly by one thumbnail by one thumbnail, and when it is determined that the image of the last thumbnail is played back in step S481, the playback process is ended.

On the other hand, when the number of images (that is, the number of thumbnails 412 to be displayed) included in the dynamic channel is six or less, this means that from a start, there exists no thumbnail 412 to be newly displayed. Accordingly, in step S482, it is determined that there exists no thumbnail 412 to be newly displayed. In step S484, the cursor 451 is moved downwardly by one thumbnail. As a result, the image of the thumbnail 412 indicated by the cursor 451 is set as the image to be played back next in step S486. Then, in step S481, the cursor 451 is sequentially moved to a next lower thumbnail 412 one by one until it is determined that the image of the last thumbnail is played back.

Figure 17A:
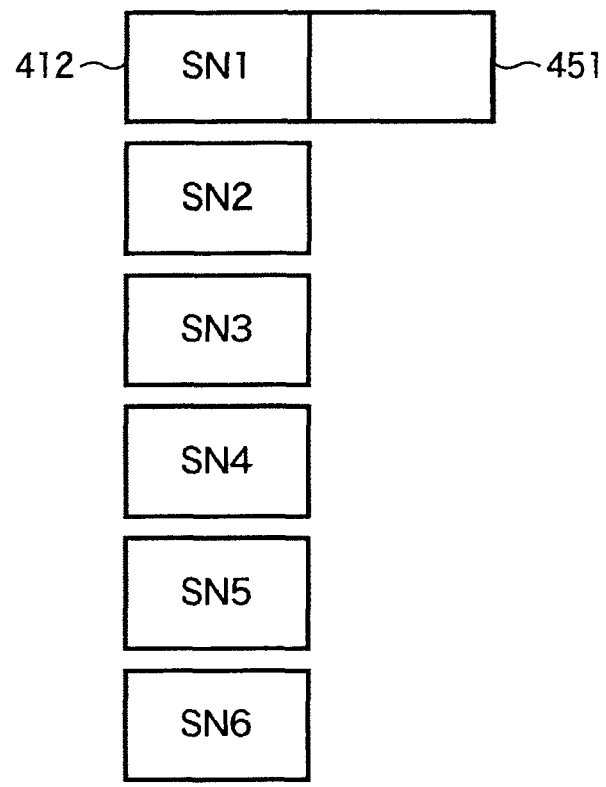
FIGS. 17A and 17B are diagrams for describing a first cursor movement.
Figure 17B:
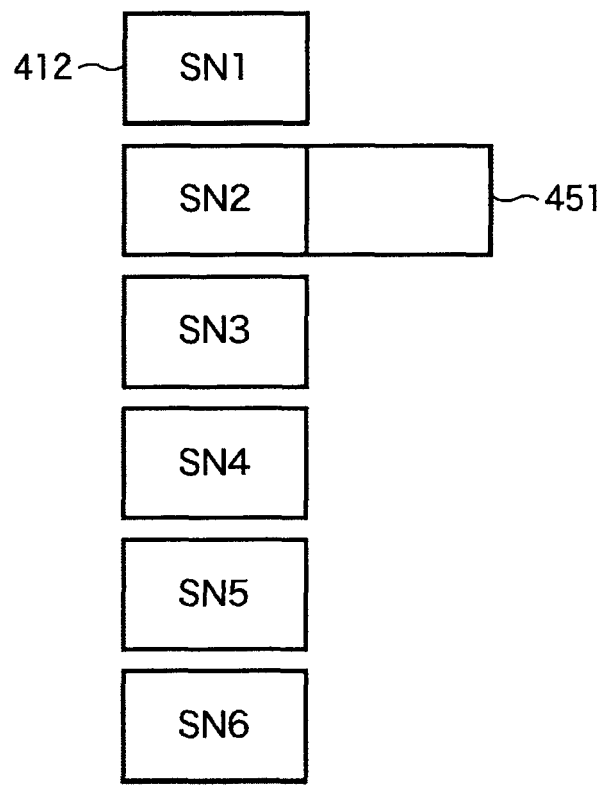
Figure 18A:
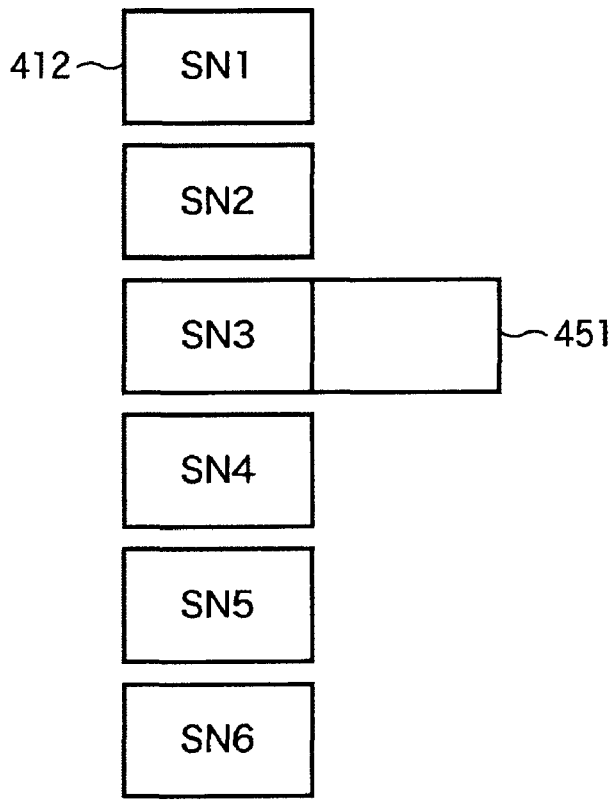
FIGS. 18A and 18B are diagrams for describing a second cursor movement.
Figure 18B:
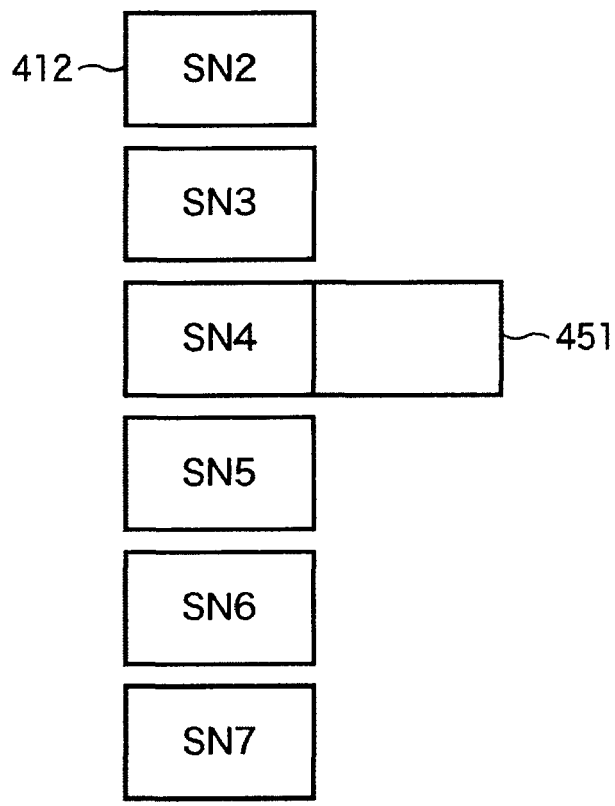

The above-described processes are summarized as in FIG. 17A to FIG. 23. That is, for example as shown in FIG. 17A to FIG. 20B, when there are twenty thumbnails 412 from SN1 to SN20, the cursor 451 is firstly displayed at a position which corresponds to the head thumbnail SN1, as shown in FIG. 17A, and thereafter, the cursor 451 is sequentially moved to a position which corresponds to the second thumbnail SN2 or the third thumbnail SN3, as shown in FIG. 17B or FIG. 18A, at each time that the playback of the corresponding image is ended. After the cursor 451 is moved to a position of the third thumbnail 412, the cursor 451 is not moved but the thumbnails SN1 to SN6 are scrolled upwardly, as shown in FIG. 18B, and the seventh thumbnail SN7 is newly displayed at the lowest position.

Figure 19A:
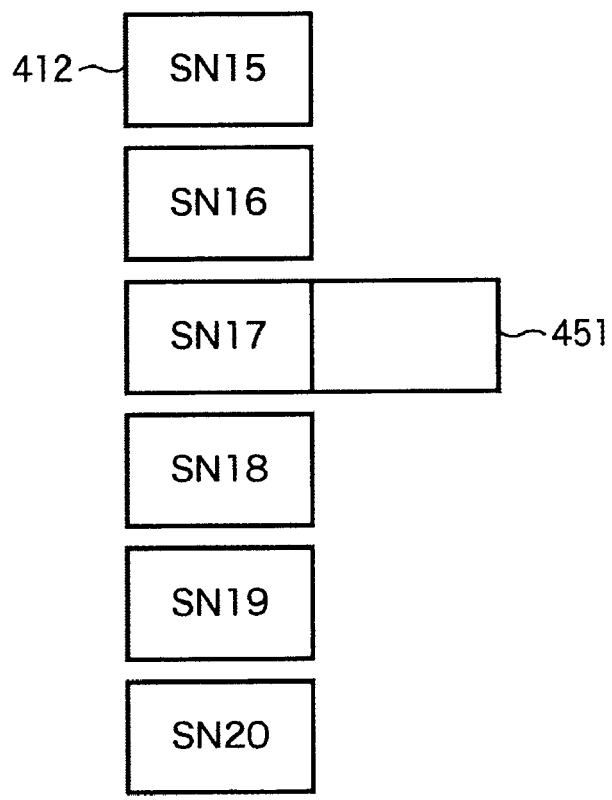
FIGS. 19A and 19B are diagrams for describing a third cursor movement.
Figure 19B:
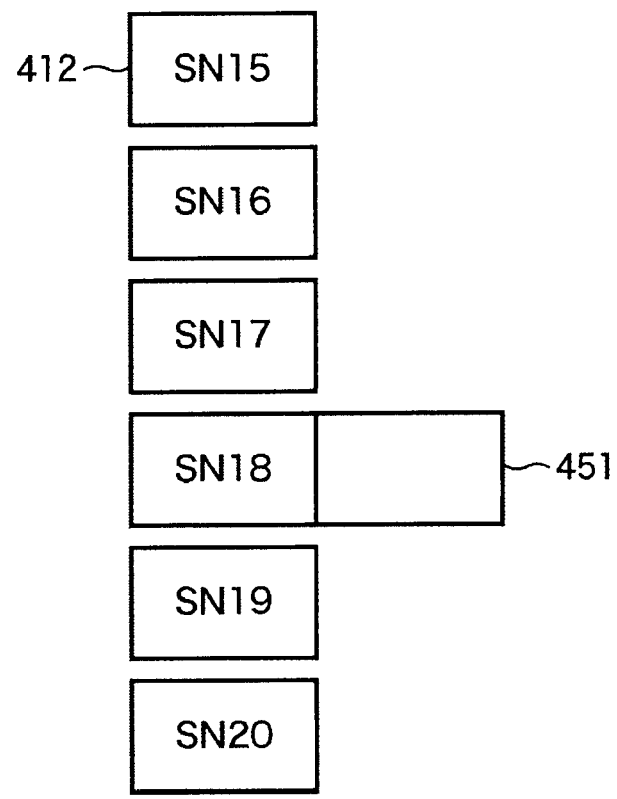
Figure 20A:
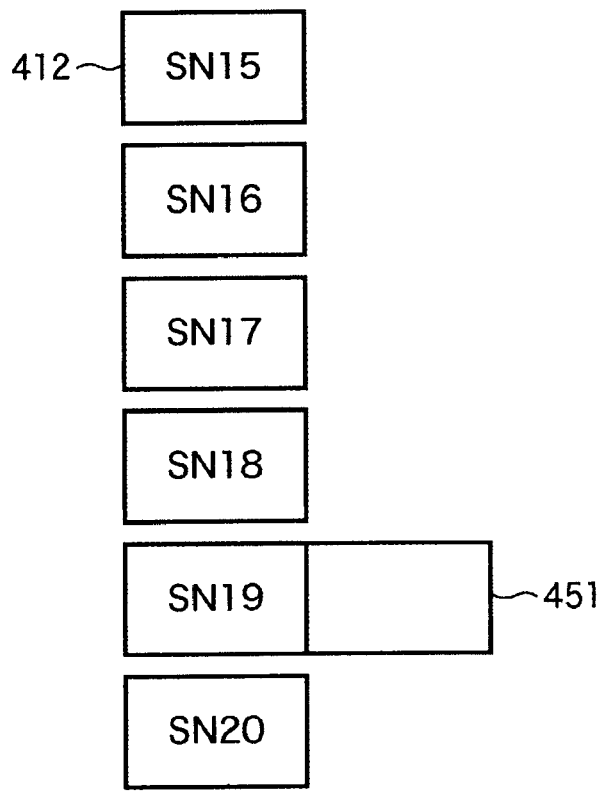
FIGS. 20A and 20B are diagrams for describing a fourth cursor movement.
Figure 20B:
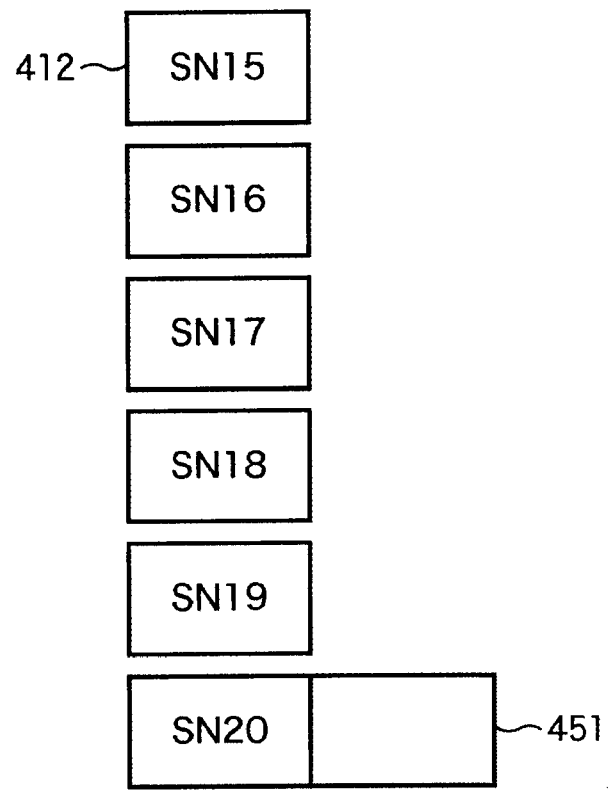
Figure 21A:
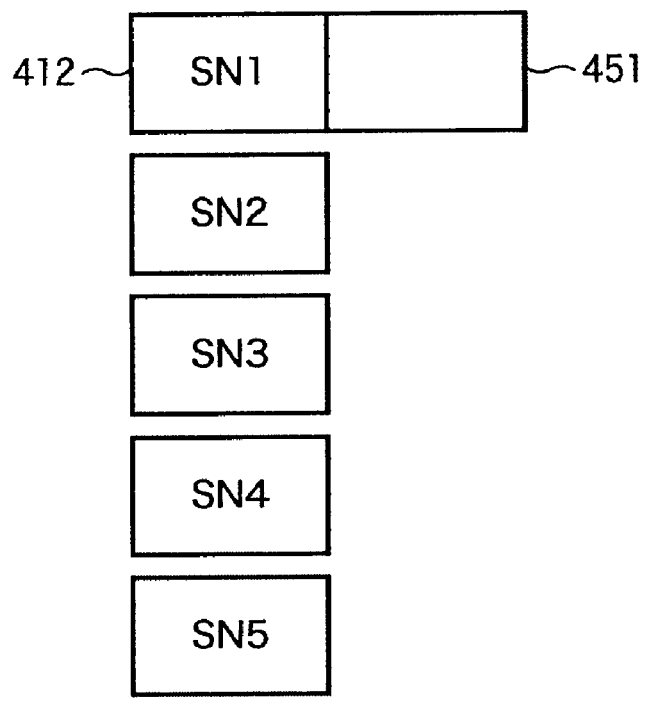
FIGS. 21A and 21B are diagrams for describing a fifth cursor movement.
Figure 21B:
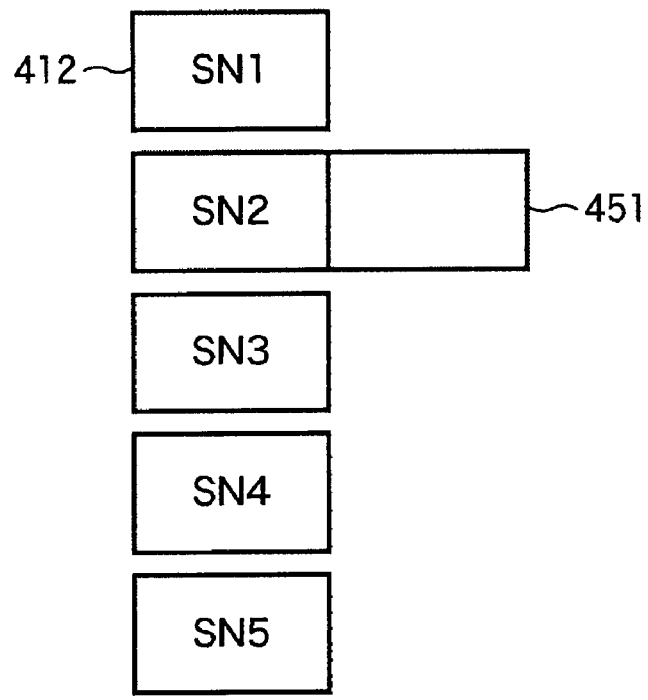
Figure 22A:
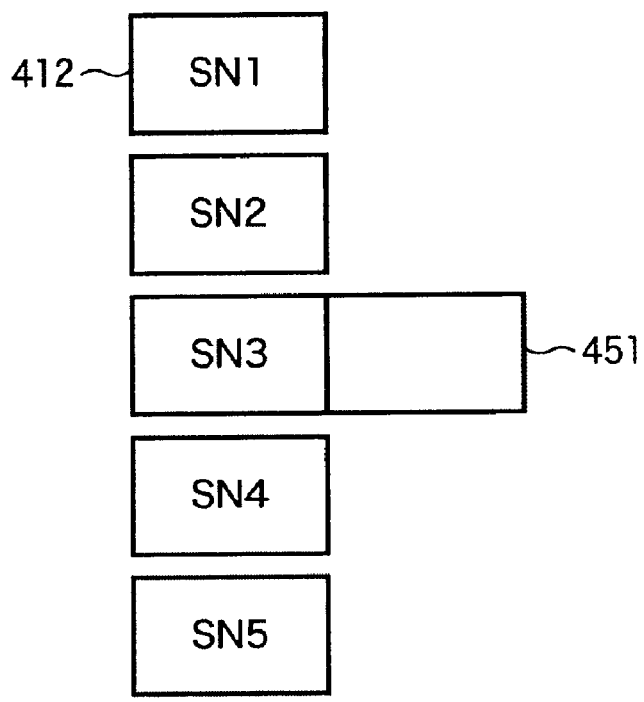
FIGS. 22A and 22B are diagrams for describing a sixth cursor movement.
Figure 22B:
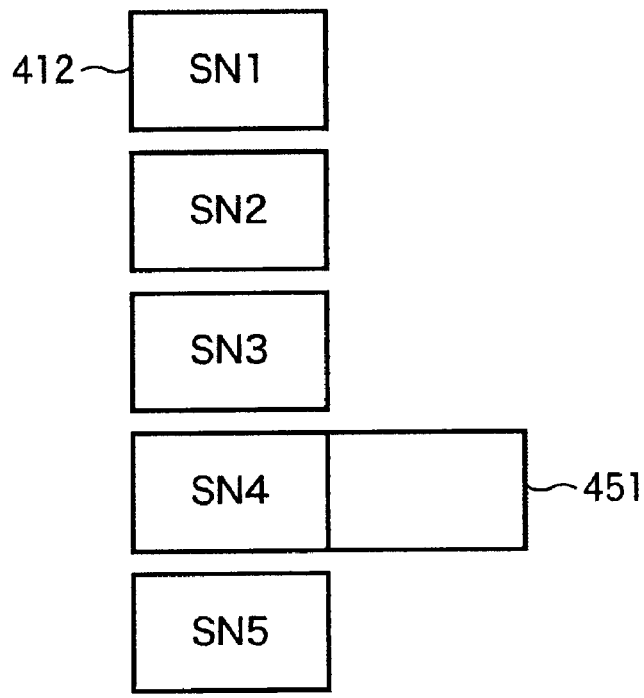
Figure 23:
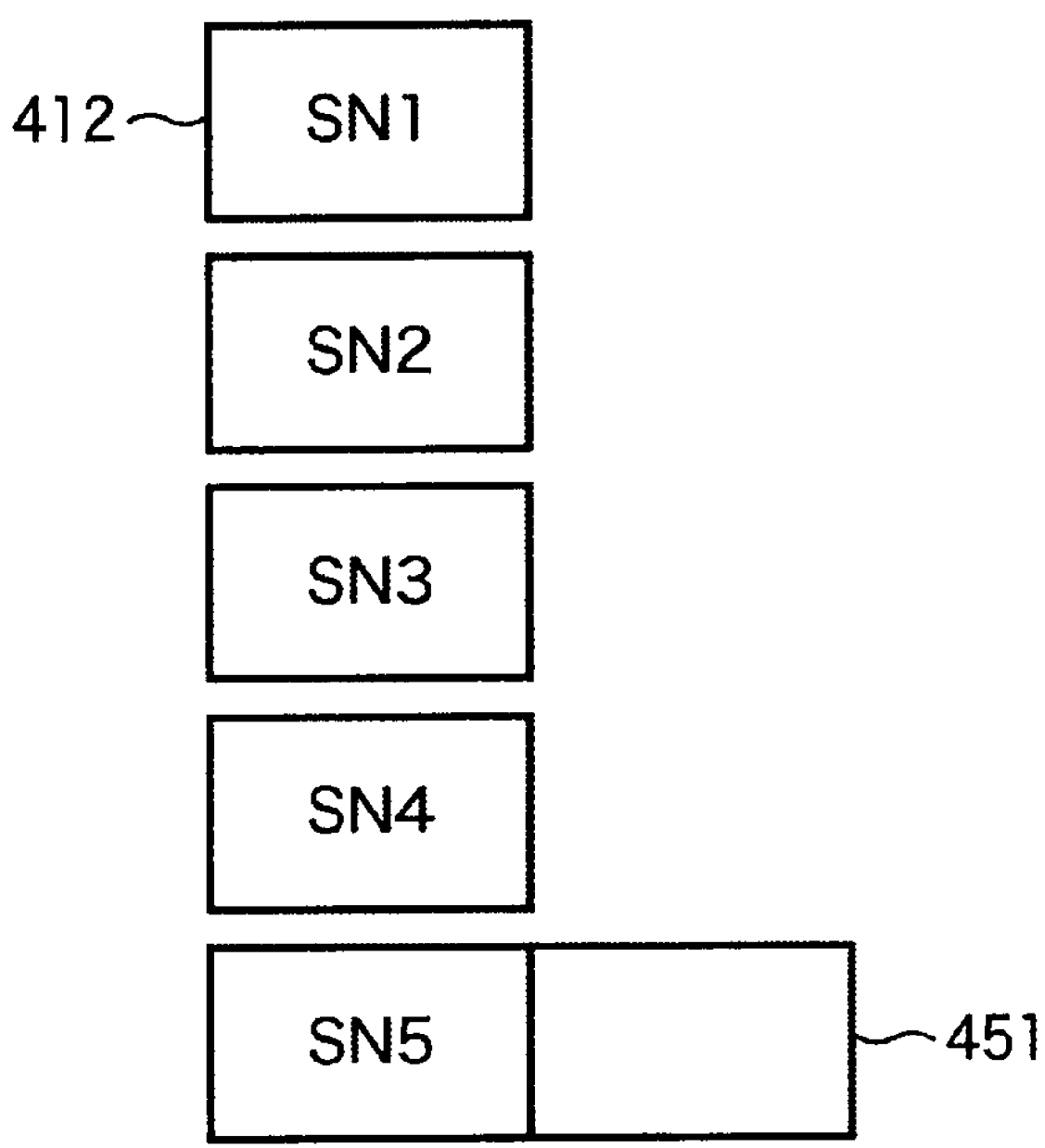
FIG. 23 is a diagram for describing a seventh cursor movement.

As shown in FIG. 19A, when the last thumbnail SN20 is displayed and there exists no thumbnail to be newly displayed, the cursor 451 is sequentially moved downwardly by one thumbnail, i.e., to positions which correspond to the thumbnails SN17, SN18, SN19, and SN20, as shown in FIG. 19B, FIG. 20A, and FIG. 20B, respectively.

As shown in FIG. 21A to FIG. 23, when there are only five thumbnails 412, i.e., from the thumbnails SN1 to SN5, in the dynamic channel, the cursor 451 is sequentially moved downwardly by one thumbnail, i.e., to positions which correspond to the thumbnails SN1, SN2, SN3, SN4, and SN5.

Thus, when the number of thumbnails is large, the cursor 451 is arranged in a fixed manner at the predetermined position which is previously determined, and whereby the user may verify the image which is being played back without question. Further, the position is placed not at an upper or lower end of the display region but at an approximate center portion thereof, and thus, this position allows the user to verify both an image which finishes playing back and an image to be played back from now. As a result, out of all images, the user may easily comprehend positioning of the image which is currently being played back.

As describe above, when the user searches once, if the user registers the search as the dynamic channel, the search condition is automatically registered. Thereafter, when the user instructs to play back the dynamic channel, the search is performed once again under the registered search condition, and the search result is automatically played back without any special operation. Accordingly, similarly to a case where the user views broadcast of a predetermined channel by a television receiver, the user may enjoy the image of the dynamic channel. Further, the search is performed at each playback, so that the user enjoys the latest content.

Figure 24:
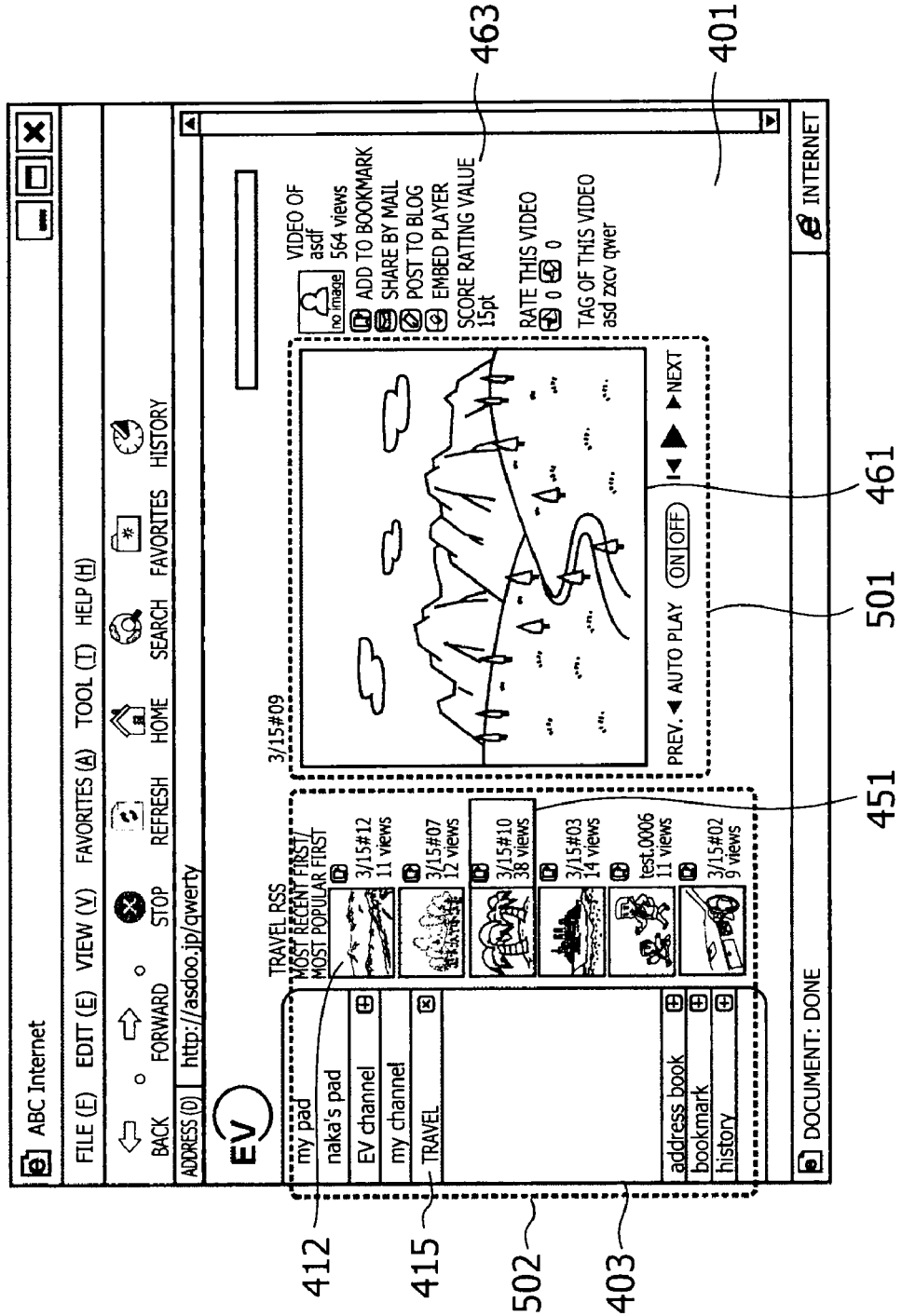
FIG. 24 is a diagram for describing a Web browser and a display of a moving-image playback unit.

Functions of the Web browser 21 and the moving-image playback unit 22 may be provided by the same software, but in the embodiment, the both components are provided by different software. That is, as shown in FIG. 24, a display of a region 501 including the display unit 461 which plays back the moving image is controlled by the moving-image playback unit 22, and that of a region 502 including the display unit 403 and the thumbnails 412 arranged in order of playback is controlled by the Web browser 21. Thus, the order of the moving image to be played back next may be changed while the moving image is being played back on the display unit 461.

Figure 25:
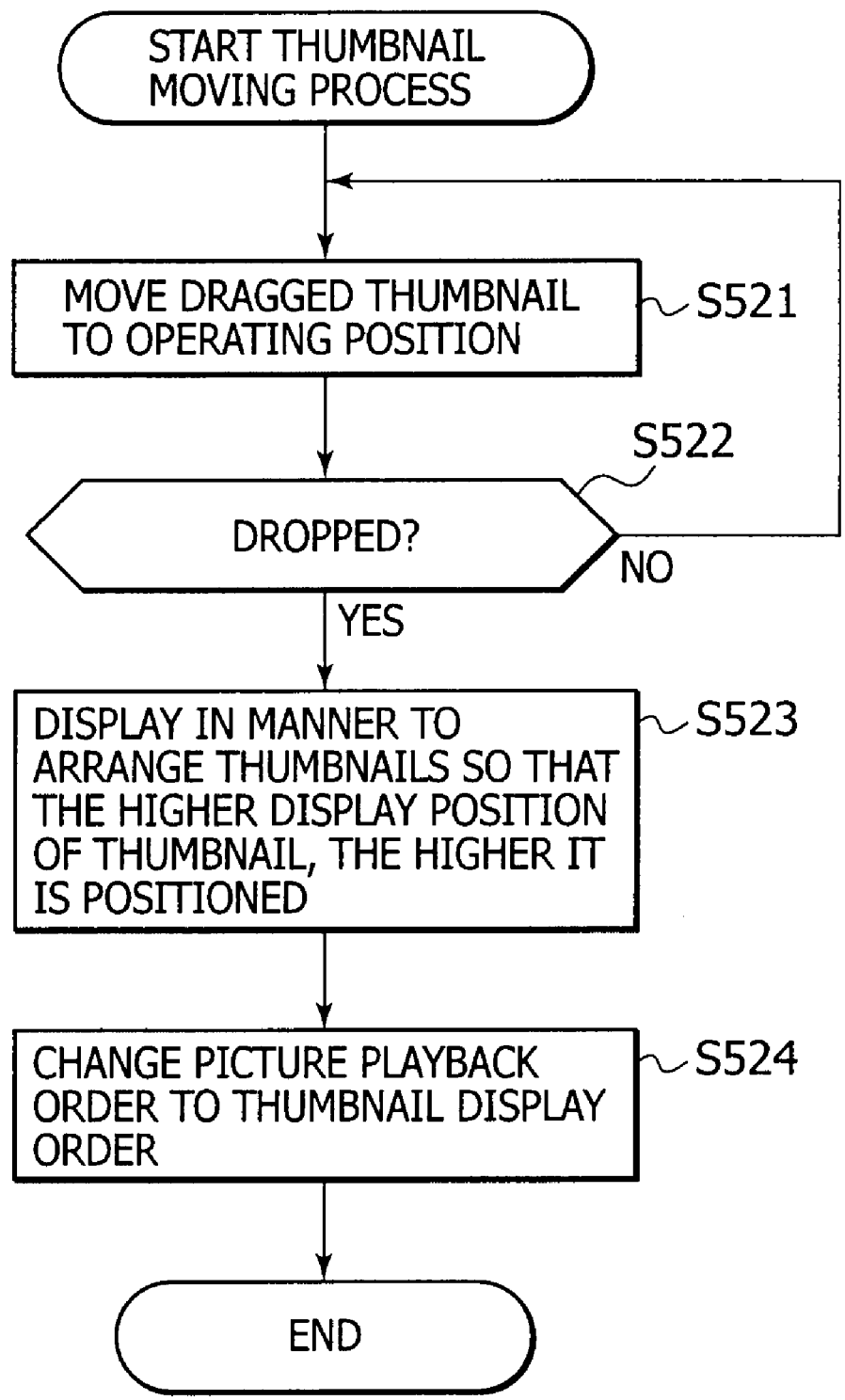
FIG. 25 is a flowchart for describing a thumbnail moving process.

That is, in the embodiment, when the user drags and drops the thumbnail, the user may change the order of playing back the moving images while the moving image is being played back. Thus, the Web browser 21 executes a thumbnail moving process as shown in FIG. 25. The process is started when the user drags the thumbnail.

In step S521, the display unit 208 moves the dragged thumbnail 412 to an operating position. More specifically, when the user operates a mouse to drag the thumbnail 412, the thumbnail 412 is moved to the operating position. In step S522, the display unit 208 determines whether the dragged thumbnail 412 is dropped. When the dragged thumbnail 412 is not dropped, the process for moving the thumbnail 412 is repeated until the dragged thumbnail 412 is dropped.

When the thumbnail 412 is dropped, in step S523, the display unit 208 displays in a manner to arrange the thumbnails such that the higher the display position of the thumbnail, the higher it is positioned. In step S524, the changing unit 210 changes an order of playing back the images to that of displaying the thumbnails.

Thus, when the user drags and drops the thumbnail to exchange the display order while the moving image is played back by the moving-image playback unit 22, the order is held in the Web browser 21. When the playback of the moving image is ended, the moving-image playback unit 22 inquires the Web browser 21 of an image to be played back next at each end of the playback (step S405 in FIG. 12), so that it becomes possible to playback the moving image according to the order arbitrarily designated and changed by the user while the moving image is being played back.

In the above-described description, the search condition of the moving image is registered in the dynamic channel. However, it is possible to register a still image and it may also be possible that the moving image and the still image coexist. The image may be a natural image obtained by photographing a predetermined subject by a video camera, a digital camera, or the like, and may also be an image artificially generated such as an animation. That is, the content shared by the users is arbitrary.

It is noted that in this specification, a step description for a program stored in a program recording medium includes not only time-series processes to be executed in the described order but also processes to be executed not necessarily in a time series manner but in a parallel manner or independently.

In the specification, the "system" represents a whole device configured by a plurality of devices.

A network which provides content is not limited to the Internet, but the "network" used herein is referred to as a mechanism in which at least two devices are connected to transmit information from one device to another device. Devices which communicate via the network may be independent from each other, and may also be internal blocks which configure one device.

It is noted that the embodiment of the present invention is not limited to the above-described embodiment and various modifications may be made insofar as they are within the scope of the appended claims.

What is claimed:

1. An information processing apparatus, comprising:
   means for registering specific information specifying a previously specified search condition;
   means for transmitting, when the registered specific information is selected, the specific information or the search condition to another information processing apparatus which executes an additional search based on the previously specified search condition;
   means for receiving a list of content matching search information retrieved based on the additional search from the another information processing apparatus;
   means for successively playing back an arbitrary number of a plurality of content included in the received list in a sequential manner;
   means for changing an order of playing back the plurality of content included in the received list by changing a display order of symbolic information representing the content included in the received list, the order of playing back and the display order being changed during playback of one of the plurality of content, the symbolic information each representing a different one of the plurality of content; and
   means for displaying the symbolic information while playing back the one of the plurality of content.

2. The information processing apparatus according to claim 1, further comprising means for selecting a rule of an order in which the symbolic information is displayed.

3. The information processing apparatus according to claim 1, wherein the symbolic information includes a thumbnail of the content.

4. The information processing apparatus according to claim 3, wherein the means for displaying automatically moves without user input a position of a cursor such that the cursor is positioned on the thumbnail in a process of playing back.

5. The information processing apparatus according to claim 4, wherein if a thumbnail is to be newly displayed, the means for displaying automatically moves without user input the position of the cursor one thumbnail at a time such that the cursor is positioned on the thumbnail in the process of playing back until a predetermined position is reached, and automatically scrolls without user input the thumbnail until there is no thumbnail to be newly displayed when the predetermined position is reached, and if no thumbnail is to be newly displayed, the means for displaying automatically moves without user input a display position of the cursor by one thumbnail at each playback ending until a playback order reaches a last thumbnail.

6. The information processing apparatus according to claim 1, wherein the means for receiving receives a list of the content matching the newly searched search information based on the previously specified search condition.

7. An information processing method of an information processing apparatus, the information processing method comprising:

registering specific information specifying a previously specified search condition;

transmitting the specific information or the search condition to another information processing apparatus which executes an additional search based on the previously specified search condition;

receiving from the another information processing apparatus a list of content matching search information searched based on the additional search;

playing back successively an arbitrary number of a plurality of content included in the received list in a sequential manner;

changing an order of playing back the plurality of content included in the received list by changing a display order of symbolic information representing the content included in the received list, the order of playing back and the display order being changed during playback of one of the plurality of content, the symbolic information each representing a different one of the plurality of content; and displaying the symbolic information while playing back the one of the plurality of content.

8. The information processing method according to claim 7, further comprising:

automatically moving without user input a position of a cursor such that the cursor is positioned on a thumbnail representing content currently in a process of being playing back.

9. The information processing method according to claim 8, further comprising:

if a thumbnail is to be newly displayed, automatically moving without user input the position of the cursor one thumbnail at a time such that the cursor is positioned on the thumbnail in the process of playing back until a predetermined position is reached, and automatically scrolling without user input the thumbnail until there is no thumbnail to be newly displayed when the predetermined position is reached, and if no thumbnail is to be newly displayed, automatically moving without user input a display position of the cursor by one thumbnail at each playback ending until a playback order reaches a last thumbnail.

10. A non-transitory computer readable medium recorded with a program for use in an information processing apparatus, the program causing a computer to execute a method comprising:

registering specific information specifying a previously specified search condition;

transmitting the specific information or the search condition to another information processing apparatus which executes an additional search based on the previously specified search condition;

receiving from the another information processing apparatus a list of content matching search information searched based on the additional search;

playing back successively an arbitrary number of a plurality of content included in the received list in a sequential manner;

changing an order of playing back the plurality of content included in the received list by changing a display order of symbolic information representing the content included in the received list, the order of playing back and the display order being changed during playback of one of the plurality of content, the symbolic information each representing a different one of the plurality of content; and displaying the symbolic information while playing back the one of the plurality of content.

11. The non-transitory computer readable medium according to claim 10, wherein the method further comprises:

automatically moving without user input a position of a cursor such that the cursor is positioned on a thumbnail representing content currently in a process of being playing back.

12. The non-transitory computer readable medium according to claim 9, wherein the method further comprises:

if a thumbnail is to be newly displayed, automatically moving without user input the position of the cursor one thumbnail at a time such that the cursor is positioned on the thumbnail in the process of playing back until a predetermined position is reached, and automatically scrolling without user input the thumbnail until there is no thumbnail to be newly displayed when the predetermined position is reached, and if no thumbnail is to be newly displayed, automatically moving without user input a display position of the cursor by one thumbnail at each playback ending until a playback order reaches a last thumbnail.

13. An information processing apparatus, comprising:

a registration unit configured to register specific information specifying a previously specified search condition;

a transmitter configured to transmit, when the registered specific information is selected, the specific information or the search condition to another information processing apparatus which executes an additional search based on the previously specified search condition;

a receiver configured to receive a list of a plurality of content matching search information retrieved based on the additional search from the another information processing apparatus;

a playback unit, including a processor, configured to play back an arbitrary number of the plurality of content included in the received list in a sequential manner;

an order changing unit configured to change an order of playing back the plurality of content included in the received list by changing a display order of symbolic information representing the content included in the received list, the order of playing back and the display order being changed during playback of one of the plurality of content, the symbolic information each representing a different one of the plurality of content; and a display unit configured to display the symbolic information while playing back the one of the plurality of content.

14. The information processing apparatus according to claim 13, wherein the display unit automatically moves without user input a position of a cursor such that the cursor is positioned on a thumbnail representing content currently in a process of being playing back.

15. The information processing apparatus according to claim 14, wherein if a thumbnail is to be newly displayed, the display unit automatically moves without user input the position of the cursor one thumbnail at a time such that the cursor is positioned on the thumbnail in the process of playing back until a predetermined position is reached, and automatically scrolls without user input the thumbnail until there is no thumbnail to be newly displayed when the predetermined position is reached, and if no thumbnail is to be newly displayed, the display unit automatically moves without user input a display position of the cursor by one thumbnail at each playback ending until a playback order reaches a last thumbnail.

\* \* \* \* \*